(12) United States Patent
Tsusaka et al.

(10) Patent No.: US 9,421,686 B2
(45) Date of Patent: Aug. 23, 2016

(54) MASTER DEVICE FOR MASTER SLAVE APPARATUS, METHOD OF CONTROLLING THE SAME, AND MASTER SLAVE ROBOT

(71) Applicant: Panasonic Corporation, Osaka (JP)

(72) Inventors: Yuko Tsusaka, Osaka (JP); Atsushi Ono, Kyoto (JP); Yudai Fudaba, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 67 days.

(21) Appl. No.: 14/285,886

(22) Filed: May 23, 2014

(65) Prior Publication Data
US 2014/0350726 A1 Nov. 27, 2014

(30) Foreign Application Priority Data

May 27, 2013 (JP) ................................. 2013-111075

(51) Int. Cl.
*B25J 3/04* (2006.01)
*B25J 13/02* (2006.01)

(52) U.S. Cl.
CPC ... *B25J 3/04* (2013.01); *B25J 13/02* (2013.01)

(58) Field of Classification Search
CPC .............. A61B 2019/2292; A61B 2019/2296; A61B 2018/1462; A61B 2019/2276; B25J 13/02; B25J 13/025; G05B 2219/40138
See application file for complete search history.

(56) References Cited

U.S. PATENT DOCUMENTS

| | | | | |
|---|---|---|---|---|
| 6,436,107 B1 * | 8/2002 | Wang | .................. | A61B 1/00149 318/568.11 |
| 6,676,669 B2 * | 1/2004 | Charles | .................. | A61B 19/22 606/1 |
| 8,394,082 B2 * | 3/2013 | Okamoto | ............. | A61B 1/0052 606/1 |
| 8,600,551 B2 * | 12/2013 | Itkowitz | ............. | A61B 19/2203 700/245 |
| 9,014,856 B2 * | 4/2015 | Manzo | ............... | A61B 1/00149 700/245 |
| 2008/0046122 A1 * | 2/2008 | Manzo | ............... | A61B 1/00149 700/245 |
| 2009/0248038 A1 | 10/2009 | Blumenkranz et al. | | |
| 2012/0191245 A1 | 7/2012 | Fudaba et al. | | |

(Continued)

FOREIGN PATENT DOCUMENTS

| | | |
|---|---|---|
| JP | 8-164807 | 6/1996 |
| JP | 2011-517419 | 6/2011 |
| WO | 2012/029227 | 3/2012 |

*Primary Examiner* — Khoi Tran
*Assistant Examiner* — Ryan Rink
(74) *Attorney, Agent, or Firm* — Wenderoth, Lind & Ponack, L.L.P.

(57) ABSTRACT

A master device is provided to a master slave apparatus in which a hand mechanism opens/closes to grip a target object and a slave mechanism performs a task on a target article. The master device includes a hand manipulation mechanism for manipulating the hand mechanism. A person remotely manipulates the slave mechanism by a master mechanism and the hand manipulation mechanism manipulates to cause the hand mechanism to perform the task. In the hand manipulation mechanism, a hand manipulation portion having a pair of open/close manipulation portions manipulated by the person moves forward/backward on a slider, the pair of open/close manipulation portions is opened/closed to change the angle therebetween so that the hand mechanism is opened/closed. A master hand control device transmits, to the slave mechanism, motion information used for manipulating the hand mechanism based on a position of the hand manipulation portion relative to the slider or the angle.

21 Claims, 30 Drawing Sheets

(56) References Cited

U.S. PATENT DOCUMENTS

| | | | |
|---|---|---|---|
| 2014/0160015 A1* | 6/2014 | Ogawa | B25J 13/02 345/156 |
| 2014/0229007 A1* | 8/2014 | Kishi | A61B 19/2203 700/257 |
| 2015/0245876 A1* | 9/2015 | Kim | B25J 13/02 700/264 |

* cited by examiner

*Fig.5C*
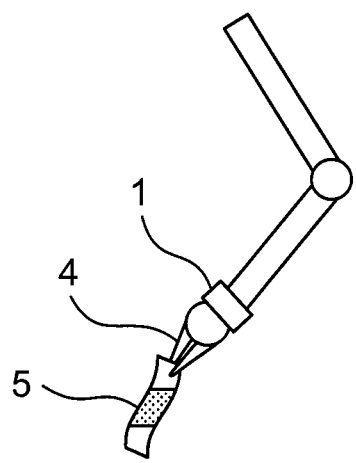
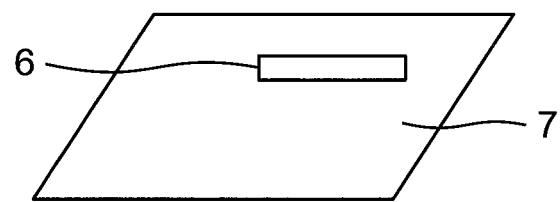
*Fig.5D*
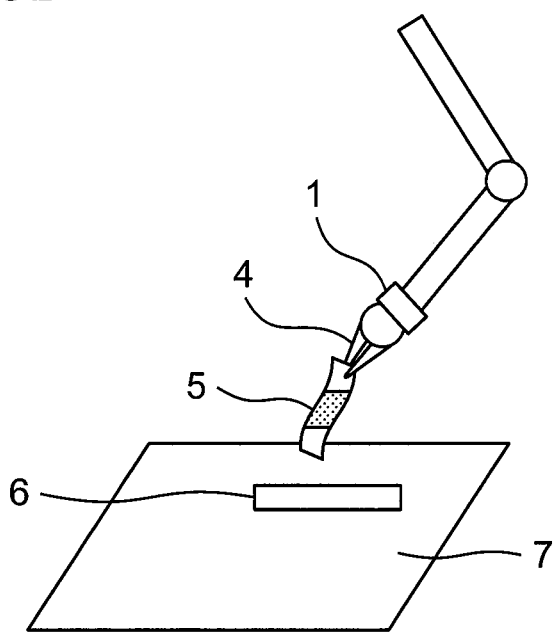

Fig.11A

| TIME (msec) | FORCE (N, Nm) | GRIPPING FORCE (N) | MASTER POSITION (m) | ANGLE OF HAND MANIPULATION PORTION (rad) | POSITION OF HAND MANIPULATION PORTION (m) | SLAVE POSITION (m) | ANGLE OF HAND (rad) | FORCE AFTER GENERATION (N, Nm) | GRIPPING FORCE AFTER GENERATION (N) | DECISION RESULT |
|---|---|---|---|---|---|---|---|---|---|---|
| $t_0$ | $f_{s0}$ | $f_{h0}$ | $p_{m0}$ | $r_{m0}$ | $l_{m0}$ | $p_{s0}$ | $r_{s0}$ | $f_{f0}$ | $f_{fh0}$ | 1 |
| $t_1$ | $f_{s1}$ | $f_{h1}$ | $p_{m1}$ | $r_{m1}$ | $l_{m1}$ | $p_{s1}$ | $r_{s1}$ | $f_{f1}$ | $f_{fh1}$ | 0 |
| : | : | : | : | : | : | : | : | : | : | : |
| $t_{10}$ | $f_{s10}$ | $f_{h10}$ | $p_{m10}$ | $r_{m10}$ | $l_{m10}$ | $p_{s10}$ | $r_{s10}$ | $f_{f10}$ | $f_{fh10}$ | 1 |
| $t_{11}$ | $f_{s11}$ | $f_{h11}$ | $p_{m11}$ | $r_{m11}$ | $l_{m11}$ | $p_{s11}$ | $r_{s11}$ | $f_{f11}$ | $f_{fh11}$ | 0 |
| ..... | ..... | ..... | ..... | ..... | ..... | ..... | ..... | ..... | ..... | ..... |

Fig.11B
| CONTROL MODE OF HAND MANIPULATION PORTION | 0 |
|---|---|
| SHIFT GAIN | (0.1, 0.1, 0.1, 0.1, 0.1, 0.1) |
| HAND ANGLE GAIN | 0.1 |
| FORCE GAIN | (10, 10, 10, 10, 10, 10) |
| GRIPPING FORCE GAIN | 10 |
| SLIDE POSITION GAIN | 0.01 |
Fig.12
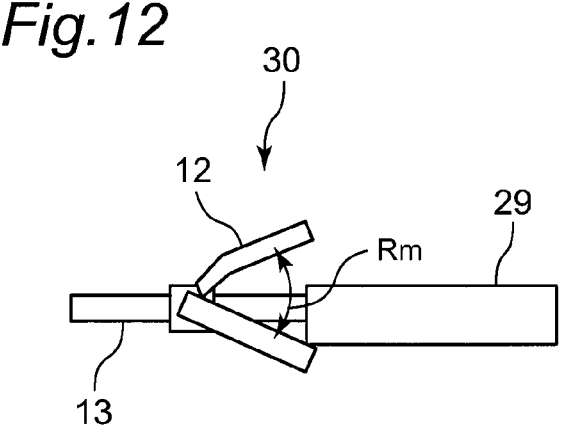
Fig.13
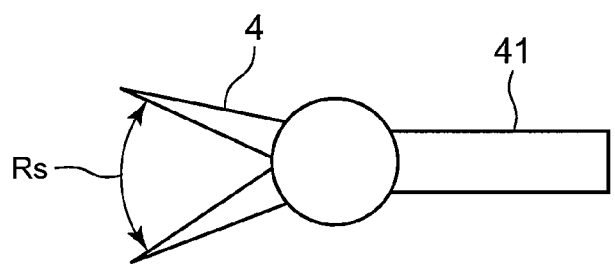

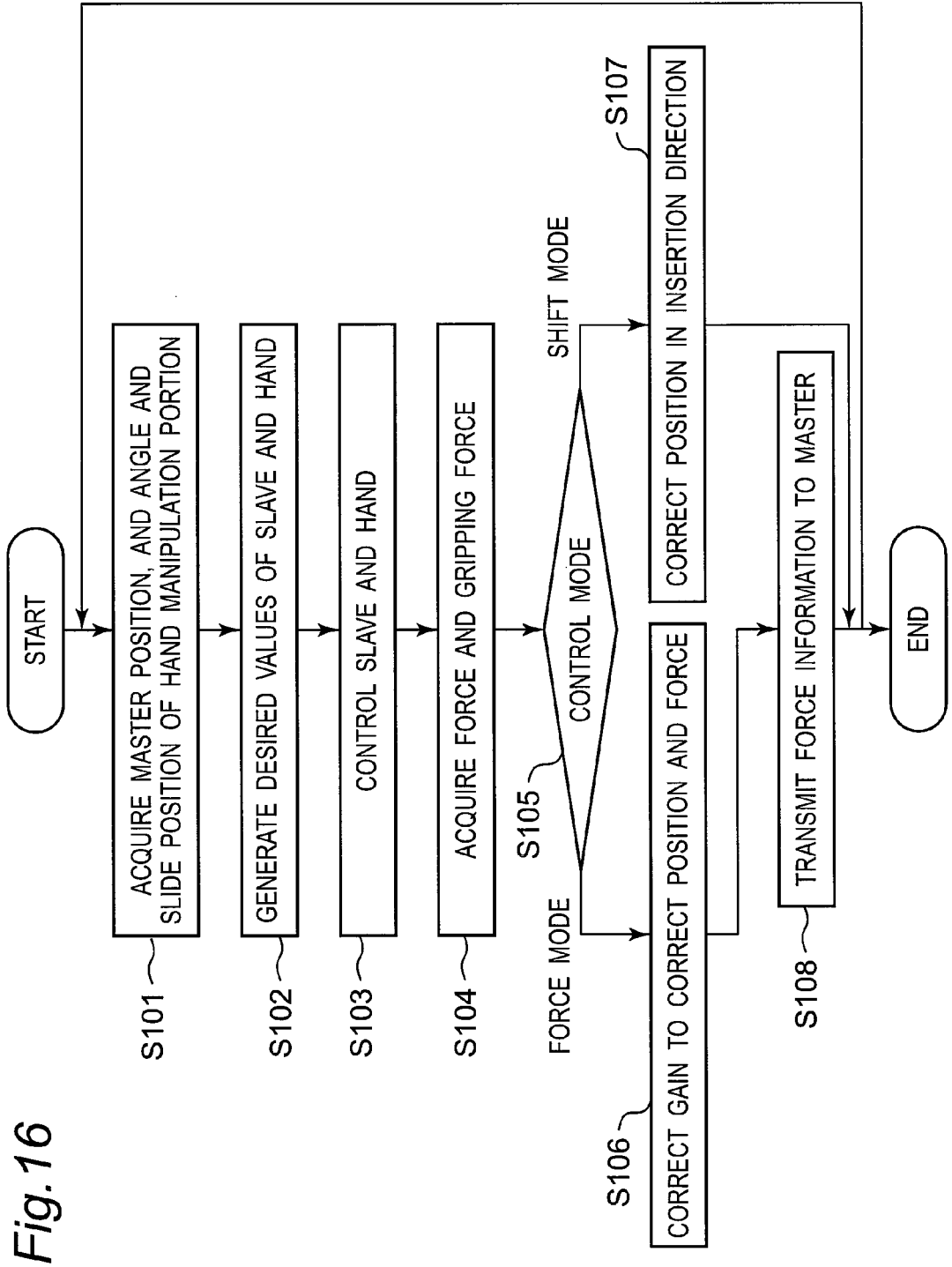

| CONTROL MODE OF HAND MANIPULATION PORTION | 0 |
|---|---|
| SHIFT GAIN | (0.1, 0.1, 0.1, 0.1, 0.1, 0.1) |
| HAND ANGLE GAIN | 0.1 |
| FORCE GAIN | (10, 10, 10, 10, 10, 10) |
| GRIPPING FORCE GAIN | 10 |
| SLIDE POSITION GAIN | 0.01 |
| INERTIA | M |
| DAMPING | D |
| STIFFNESS | K |

MASTER DEVICE FOR MASTER SLAVE APPARATUS, METHOD OF CONTROLLING THE SAME, AND MASTER SLAVE ROBOT

TECHNICAL FIELD

The technical field relates to a master device for a master slave apparatus, a method of controlling the same, and the master slave apparatus. The master device for the master slave apparatus of a master slave robot generates and outputs motion of a robot or the like.

BACKGROUND ART

Patent Literature 1 discloses a technique of providing a force sensor to an arm portion or a surgical instrument of a surgical robot so as to detect force applied to the distal ends of forceps or force applied to a robot arm using the force sensor and feed back to a surgeon.

CITATION LIST

Patent Literature

[Patent Literature 1] JP 2011-517419 W

SUMMARY OF THE INVENTION

When a person actually grips and manipulates tweezers, the person senses force varied depending on a gripped position of the tweezers. In a case where the person grips the tweezers at a position near the distal ends, the person can sense detailed variation in gripping force. In another case where the person grips the tweezers at a position distant from the distal ends, the person cannot sense detailed variation in force, unlike the case where the person grips the tweezers at a position near the distal ends.

According to Patent Literature 1, force applied to a slave machine is corrected and fed back to a master machine, although the master machine does not switch a manner of gripping the tweezers or does not finely correct the fed back force in accordance with the gripped position.

One non-limiting and exemplary embodiment provides a master device for a master slave apparatus, a method of controlling the same, and a master slave robot. The master device is capable of feeding back a value approximate to force sensed by a hand of a person as if the person directly manipulates tweezers or a gripper while changing a gripped position.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature: A master device for a master slave apparatus, provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to cause a person (operator) to remotely manipulate the slave mechanism, the person remotely manipulating the hand manipulation mechanism of the master mechanism to cause the hand mechanism of the slave mechanism to grip the target object and perform the task on the target article, wherein the hand manipulation mechanism includes a hand manipulation portion having a pair of open/close manipulation portions manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, and the master device further comprises a master hand control device configured to transmit, to the slave mechanism, motion information used for manipulating the hand mechanism in accordance with a position of the hand manipulation portion relative to the slider and the angle between the pair of open/close manipulation portions.

These general and specific aspects may be implemented using a system, a method, and a computer program, and any combination of systems, methods, and computer programs.

According to the aspect of the present invention, the master mechanism is capable of feeding back, to a hand of the person, a value approximate to force sensed by the hand of the person when manipulating tweezers or a gripper gripped by the slave mechanism while changing a gripped position. It is thus possible to sense force as if the gripped position of the tweezers or the gripper is changed.

BRIEF DESCRIPTION OF THE DRAWINGS

These and other aspects and features of the present disclosure will become clear from the following description taken in conjunction with the embodiments thereof with reference to the accompanying drawings, in which:

FIG. 5C is an explanatory view of the component inserting manipulation of the slave mechanism in the shift mode according to the first embodiment of the present invention;

FIG. 5D is an explanatory view of the component inserting manipulation of the slave mechanism in the shift mode according to the first embodiment of the present invention;

FIG. 11A is a chart on a motion information database according to the first embodiment of the present invention;

FIG. 11B is a chart on a control information database according to the first embodiment of the present invention;

FIG. 12 is an explanatory view of an angle of a hand manipulation portion according to the first embodiment of the present invention;

FIG. 13 is an explanatory view of an angle of a hand according to the first embodiment of the present invention;

FIG. 16 is a flowchart of the master slave apparatus according to the first embodiment of the present invention;

DETAILED DESCRIPTION

Figure 1:
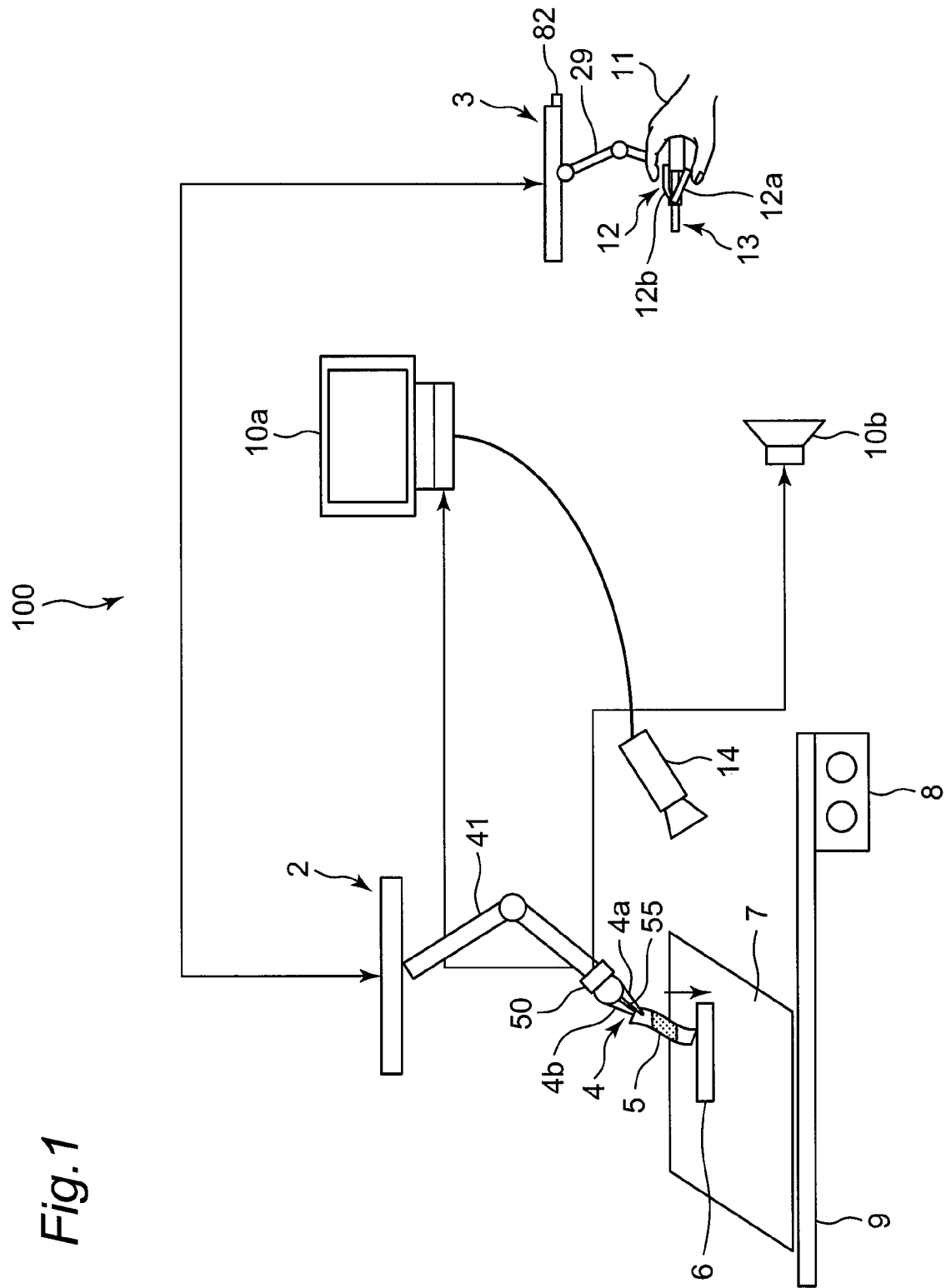
FIG. 1 is a view of a schematic configuration of a master slave apparatus according to a first embodiment of the present invention.

The embodiments of the present disclosure are described below with reference to the accompanying drawings.

Before the description of the various embodiments proceeds, various approaches made by the inventors to accomplish the embodiments are explained.

Examples of the disclosed technique are as follows.

1st aspect: A master device for a master slave apparatus, provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to cause a person to remotely manipulate the slave mechanism, the person remotely manipulating the hand manipulation mechanism of the master mechanism to cause the hand mechanism of the slave mechanism to grip the target object and perform the task on the target article, wherein the hand manipulation mechanism includes a hand manipulation portion having a pair of open/close manipulation portions manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, and the master device further comprises a master hand control device configured to transmit, to the slave mechanism, motion information used for manipulating the hand mechanism in accordance with a position of the hand manipulation portion relative to the slider and the angle between the pair of open/close manipulation portions.

This configuration enables generation of force information to be fed back to the master mechanism in accordance with a slide position of the hand manipulation portion. Thus, the master mechanism is capable of feeding back, to a hand of the person, a value approximate to force sensed by the hand of the person when manipulating tweezers or a gripper gripped by the slave mechanism while changing a gripped position. It is thus possible to sense force as if the gripped position of the tweezers or the gripper is changed.

2nd aspect: The master device for the master slave apparatus according to the 1st aspect, wherein the motion information used for manipulating the hand mechanism includes angle information on the hand manipulation portion and a position of the slave mechanism.

The master mechanism is capable of feeding back, to a hand of the person, a value approximate to force sensed by the hand of the person when manipulating tweezers or a gripper gripped by the slave mechanism while changing a gripping angle of the tweezers or gripper and/or a position of the slave mechanism in accordance with the position of the hand manipulation portion and the angle between the pair of open/close manipulation portions. It is thus possible to sense force as if the gripped position of the tweezers or the gripper is changed.

3rd aspect: A master device for a master slave apparatus, provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to cause a person to remotely manipulate the slave mechanism, the person remotely manipulating the hand manipulation mechanism of the master mechanism to cause the hand mechanism of the slave mechanism to grip the target object and perform the task on the target article, wherein the hand manipulation mechanism includes a hand manipulation portion having a pair of open/close manipulation portions manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, the master device further comprises a motion information generator and a master hand controller, the motion information generator configured to, in accordance with a position of the hand manipulation portion relative to the slider, generate motion information to increase generated force information or generated gripping force information as the position of the hand manipulation portion relative to the slider shifts to be distant from an edge of an end of the master mechanism, and generate motion information to decrease the generated force information or the generated gripping force information as the position of the hand manipulation portion relative to the slider shifts so as to be close to the edge of the end of the master mechanism, and the master hand controller configured to transmit, to the slave mechanism, the motion information generated by the motion information generator.

This configuration increases the force fed back to the master mechanism as the slide position of the hand manipulation portion shifts forward relatively to the slider (so as to be distant from the edge of the end of the master mechanism), so as to provide a sense as if the tweezers are gripped directly.

4th aspect: The master device for the master slave apparatus according to the 1st aspect, wherein the slider is coupled to an end of the master mechanism, and the master device further comprises:

a slide position acquiring unit configured to acquire a position of the hand manipulation portion relative to the end of the master mechanism as the position of the hand manipulation portion relative to the slider, and an open/close angle acquiring unit configured to acquire the angle between the pair of open/close manipulation portions of the hand manipulation portion.

This configuration enables fine adjustment of a position in an approach direction such as a direction of the task (e.g. an insertion direction) of the target object by the slave mechanism in accordance with the slide position of the hand manipulation portion.

5th aspect: The master device for the master slave apparatus according to the 1st aspect, wherein the slider is coupled to an end of the master mechanism,
the master device further comprises:
a slide position acquiring unit configured to acquire a position of the hand manipulation portion relative to the end of the master mechanism as the position of the hand manipulation portion relative to the slider,
an open/close angle acquiring unit configured to acquire the angle between the pair of open/close manipulation portions of the hand manipulation portion,
a force information acquiring unit configured to acquire information on force externally applied to the slave mechanism, and
a gripping force information acquiring unit configured to acquire information on gripping force of the hand mechanism gripping the target object,
the master hand control device includes
a motion information generator configured to generate generated force information or generated gripping force information for motion information in accordance with the position of the hand manipulation portion relative to the slider and the force information acquired by the force information acquiring unit or the gripping force information acquired by the gripping force information acquiring unit, and
a master hand controller configured to transmit, to the master mechanism, the generated force information and the generated gripping force information generated by the motion information generator as the motion information, and
the master slave apparatus further includes a slave hand controller connected to the slave mechanism and the master hand controller, the slave hand controller configured to output, as motion information to be transmitted to the slave mechanism, the motion information on the master mechanism received from the master hand controller.

This configuration enables feedback from the master mechanism to the hand of the person in accordance with the position of the hand manipulation portion relative to the slider and the force information acquired by the force information acquiring unit or the gripping force information acquired by the gripping force information acquiring unit. It is thus possible to sense force as if the gripped position of tweezers or a gripper is changed.

6th aspect: The master device for the master slave apparatus according to the 5th aspect, wherein the motion information generator is connected to the slave mechanism and the master hand controller, and is configured to generate motion information on the master mechanism transmitted from the master hand control device in accordance with the position of the hand manipulation portion relative to the slider detected by the slide position detector.

This configuration enables feedback from the master mechanism to the hand of the person in accordance with the position, detected by the slide position detector, of the hand manipulation portion relative to the slider. It is thus possible to sense force as if the gripped position of the tweezers or the gripper is changed.

7th aspect: The master device for the master slave apparatus according to any one of the 1st to 6th aspects, further comprising:

a control information setting unit configured to switch a control mode between a shift mode for shifting the hand mechanism and a force mode for allowing the hand mechanism to perform the task, wherein the master hand control device is configured to output motion information used for controlling the slave mechanism in accordance with the control mode set by the control information setting unit.

This configuration enables switching between the mode for fine adjustment of the position of the hand mechanism and the mode for feedback of a sense of force as if the gripped position of the tweezers is changed, using the control information setting unit for switching the control mode between the shift mode for shifting the hand mechanism and the force mode for performing the task at the hand mechanism.

8th aspect: The master device for the master slave apparatus according to the 7th aspect, further comprising:

a reset mode setting unit configured to set a reset mode for temporally stopping control operation to reset the position of the hand manipulation portion relative to the slider when the control information setting unit switches the control mode between the shift mode and the force mode.

This configuration enables temporarily stopping the control operation in the reset mode. An operator is thus capable of shifting the hand manipulation portion to an easily manipulatable position (e.g. an initial position near the rear end of the slider).

9th aspect: The master device for the master slave apparatus according to the 5th aspect, wherein the motion information generator is configured to generate to increase the generated force information or the generated gripping force information as the position of the hand manipulation portion relative to the slider shifts to be distant from an edge of the end of the master mechanism, and to decrease the generated force information or the generated gripping force information as the position of the hand manipulation portion relative to the slider shifts to be close to the edge of the end of the master mechanism.

This configuration increases the force fed back to the master mechanism as the slide position of the hand manipulation portion shifts forward relatively to the slider (so as to be distant from the edge of the end of the master mechanism), so as to provide a sense as if the tweezers are gripped directly.

10th aspect: The master device for the master slave apparatus according to any one of the 1st to 9th aspects, further comprising:

a human force acquiring unit configured to acquire the force applied by the person when the person grips the hand manipulation portion, wherein the control information setting unit is configured to set a mechanical impedance value of the hand manipulation portion in accordance with the force of the person acquired by the human force acquiring unit and the position of the hand manipulation portion relative to the slider, and the master hand control device is configured to control the hand manipulation portion in accordance with the mechanical impedance value set by the control information setting unit.

This configuration sets the mechanical impedance value of the hand manipulation portion, so as to finely control maneuverability of the tweezers.

11th aspect: The master device for the master slave apparatus according to the 10th aspect, wherein the control information setting unit is configured to set to decrease an inertia value of the mechanical impedance value as the position of the hand manipulation portion relative to the slider shifts to be distant from the edge of the end of the master mechanism.

This configuration sets the inertia value of the mechanical impedance value so as to be decreased as the slide position of the hand manipulation portion shifts forward relatively to the slider (so as to be distant from the edge of the end of the master mechanism), so as to provide inertia as if the distal ends of the tweezers are gripped directly.

12th aspect: The master device for the master slave apparatus according to the 10th aspect, wherein the control information setting unit is configured to set to decrease a stiffness value as the mechanical impedance value as the position of the hand manipulation portion relative to the slider shifts to be distant from the edge of the end of the master mechanism.

This configuration sets the stiffness value of the mechanical impedance value so as to be decreased as the slide position of the hand manipulation portion shifts forward relatively to the slider (so as to be distant from the edge of the end of the master mechanism) so as to provide stiffness as if the distal ends of the tweezers are gripped directly.

13th aspect: The master device for the master slave apparatus according to the 10th aspect, wherein the control information setting unit is configured to set to decrease a damping value as the mechanical impedance value as the position of the hand manipulation portion relative to the slider shifts to be distant from the edge of the end of the master mechanism.

This configuration sets the damping value of the mechanical impedance value so as to be decreased as the slide position of the hand manipulation portion shifts forward relatively to the slider (so as to be distant from the edge of the end of the master mechanism), so as to provide damping as if the distal ends of the tweezers are gripped directly.

14th aspect: A master slave apparatus comprising:
the master device for the master slave apparatus according to any one of the 1st to 13th aspects;
the hand mechanism; and
the slave mechanism.

This configuration enables generation of force information to be fed back to the master mechanism in accordance with a slide position of the hand manipulation portion. Thus, the master mechanism is capable of feeding back, to a hand of the person, a value approximate to force sensed by the hand of the person when manipulating tweezers or a gripper gripped by the slave mechanism while changing a gripped position. It is thus possible to sense force as if the gripped position of the tweezers or the gripper is changed.

15th aspect: A method of controlling a master device for a master slave apparatus, the master device being provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to cause a person to remotely manipulate the slave mechanism, the person remotely manipulating the hand manipulation mechanism of the master mechanism to cause the hand mechanism of the slave mechanism to grip the target object and perform the task on the target article,
the hand manipulation mechanism including a hand manipulation portion having a pair of open/close manipulation portions manipulated by the person, and a slider along which the hand manipulation portion moves forward or backward, the pair of open/close manipulation portions being configured to be manipulated to be opened or closed between opened positions and closed positions to change an angle between the pair of open/close manipulation portions and open or close a pair of open/close members of the hand mechanism,
the method comprising:
acquiring, at a slide position acquiring unit, a position of the hand manipulation portion relative to the end of the master mechanism as the position of the hand manipulation portion relative to the slider coupled to the end of the master mechanism;
acquiring, at an open/close angle acquiring unit, the angle between the pair of open/close manipulation portions of the hand manipulation portion; and
transmitting from a master hand control device to the slave mechanism, motion information used for manipulating the hand mechanism in accordance with the position of the hand manipulation portion relative to the slider or the angle between the pair of open/close manipulation portions.

This configuration enables generation of force information to be fed back to the master mechanism in accordance with a slide position of the hand manipulation portion. Thus, the master mechanism is capable of feeding back, to a hand of the person, a value approximate to force sensed by the hand of the person when manipulating tweezers or a gripper gripped by the slave mechanism while changing a gripped position. It is thus possible to sense force as if the gripped position of the tweezers or the gripper is changed.

First Embodiment

Schematically described is a master slave apparatus 100 including a master device 80 for the master slave apparatus according to the first embodiment of the present invention.

FIG. 1 shows a component inserting task using the master slave apparatus 100.

As shown in FIG. 1, exemplified herein is a task of attaching a component (an example of a target object) 5 to an insertion port (an example of a target article [an article to be subjected to a task]) 6 of a printed circuit board for an instrument 7 such as a television, a DVD recorder, or a mobile phone in cell production at a plant.

<<Master Slave Apparatus 100, Master Device 80, and Slave Device 81>>

The master slave apparatus 100 includes a slave device 81 and the master device 80. The slave device 81 has a slave mechanism 41 and a hand mechanism 4 provided to the slave mechanism 41. The master device 80 has a master mechanism 29 and a hand manipulation mechanism 30 provided to the master mechanism 29. In the master slave apparatus 100, a person such as an operator 11 remotely manipulates the hand manipulation mechanism 30 of the master mechanism 29 in the master device 80. The master device 80 then transmits motion information (generated information to be described later) to the slave device 81 so as to move the hand mechanism 4 of the slave mechanism 41. The hand mechanism 4 grips the target object 5 and performs the task on the target article 6.

More specifically, the master slave apparatus 100 at least includes a master robot 3, a slave robot 2, a database input/output unit 45, and a force measurement device 1. The operator 11 manipulates the master robot 3 in accordance with input or the like received from the database input/output unit 45, so as to move the master robot 3. The master robot 3 and the database input/output unit 45 configure one example of the master device 80. The slave robot 2 configures one example of the slave device 81. The master slave apparatus 100 further includes, where necessary, a control information database 42 and a motion information database 44 both of which are connected to the database input/output unit 45.

The master robot 3 includes the master mechanism 29, the hand manipulation mechanism 30, and a master hand control device 23. One example of the master mechanism 29 is a robot arm. The master mechanism 29 is touched directly by the operator 11 to receive master manipulation. The hand manipulation mechanism 30 is provided at the distal end of the master mechanism 29 and manipulates the hand mechanism 4. The master hand control device 23 to be detailed later transmits, by way of a slave hand controller 32 to the slave mechanism 41, motion information (generated information to be described later) used for manipulating the hand mechanism 4 in accordance with operation information (a position of a hand manipulation portion 12 relative to a slider 13 or an angle between a pair of open/close manipulation portions 12a and 12b provided to the hand manipulation portion 12) acquired by the hand manipulation mechanism 30.

The slave robot 2 is a robot system that is provided separately from the master robot 3, at least includes the slave mechanism 41 and the hand mechanism 4, and actually performs a predetermined task. One example of the slave mechanism 41 is a robot arm and the slave mechanism 41 performs slave motion. The hand mechanism 4 is located at the distal end of the slave mechanism 41 and opens or closes to grip the target object 5. The slave robot 2 further includes a slave hand control device 31. The slave hand control device 31 receives, from the master hand control device 23, motion information (generated information to be described later) used for manipulating the hand mechanism 4, and controls motion of the slave mechanism 41 and the hand mechanism 4.

One example of the slave robot 2 in the master slave apparatus 100 is a robot that is located on a workbench 9 or a wall surface where the instrument 7 is provided, and performs the task of inserting the component 5 into the insertion port 6 of the instrument 7.

The workbench 9 is provided, on a side, with an input IF 8 such as an operator control panel having buttons or the like. The input IF 8 exemplifies a user input/output unit 83. A reset button 82 to be described later also exemplifies the user input/output unit 83. Received information is stored in the control information database 42 or the like.

<<Hand Mechanism 4>>

The hand mechanism 4 for gripping the component 5 is attached to the distal end of the slave robot 2.

The hand mechanism 4 is a hand exemplified by tweezers. The tweezers is constituted by a pair of open/close members 4a and 4b that is openable and closable about a turn fulcrum at rear ends, and are capable of gripping the target object at the distal ends of the pair of open/close members 4a and 4b. More specifically, the target object can be gripped when the distal ends of the pair of open/close members 4a and 4b are closed, whereas the target object can be released when the distal ends of the pair of open/close members 4a and 4b are opened.

<<Hand Manipulation Mechanism 30>>

The hand manipulation mechanism 30 is a mechanism that manipulates the hand mechanism 4, and includes the hand manipulation portion 12 and the slider (hand supporter) 13 to be manipulated to open or close the hand such as the tweezers of the hand mechanism 4. The hand manipulation portion 12 has the pair of open/close manipulation portions 12a and 12b to be manipulated to be opened or closed by the operator 11. The pair of open/close manipulation portions 12a and 12b moves forward or backward on the slider 13. The operator 11 grips the hand manipulation portion 12 with a hand and is capable of independently performing manipulation of opening or closing the hand manipulation portion 12 and manipulation of sliding the hand manipulation portion 12 on the slider 13.

The slider 13 has an end coupled to the distal end of the robot arm exemplifying the master mechanism 29, and includes a linear slide rail 13a and a manipulation portion supporter 13b that is engaged with the slide rail 13a and is manually slid on the slide rail 13a. The manipulation portion supporter 13b is provided with the pair of open/close manipulation portions 12a and 12b arranged to form a V shape with the center on the turn fulcrum.

The pair of open/close manipulation portions 12a and 12b includes a movable manipulation portion 12a and a fixed manipulation portion 12b. The movable manipulation portion 12a is capable of turning to be opened or closed by fingers of the operator 11 within a predetermined angle range relatively to the fixed manipulation portion 12b. For example, when a thumb of the operator 11 is in contact with the movable manipulation portion 12a and an index finger is in contact with the fixed manipulation portion 12b, the movable manipulation portion 12a is turned about the turn fulcrum toward the fixed manipulation portion 12b so as to move the thumb toward the index finger, or is turned reversely. The pair of open/close members 4a and 4b of the tweezers can be accordingly opened or closed. The manipulation portion supporter 13b can be moved forward or backward along the slide rail 13a regardless of whether the movable manipulation portion 12a and the fixed manipulation portion 12b are opened or closed. It is thus possible to shift a gripped position to pressurize the tweezers toward the distal ends or the rear end of the tweezers (force mode) or slightly shift the tweezers themselves (shift mode) at the pair of open/close members 4a and 4b of the tweezers by switching between the modes to be described later.

The hand manipulation mechanism 30 and the hand mechanism 4 according to a specific example are described below.

Figure 2A:
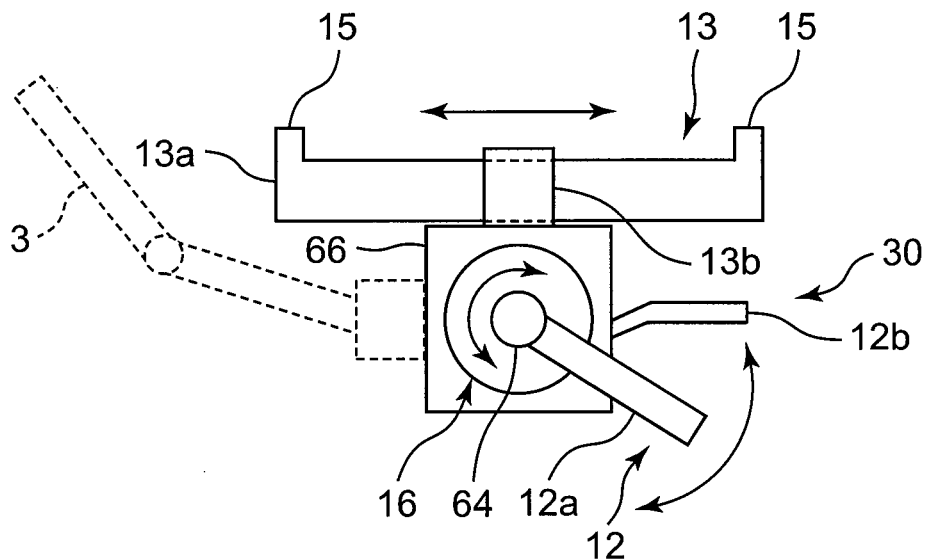
FIG. 2A is a top plan view of a master hand manipulation mechanism according to the first embodiment.
Figure 2B:
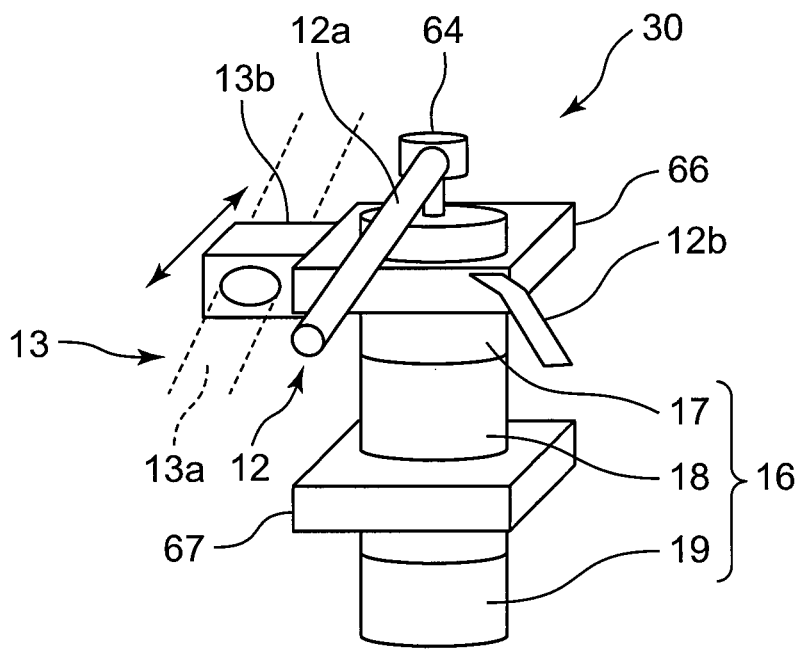
FIG. 2B is a perspective side view of the hand manipulation mechanism according to the first embodiment.
Figure 2C:
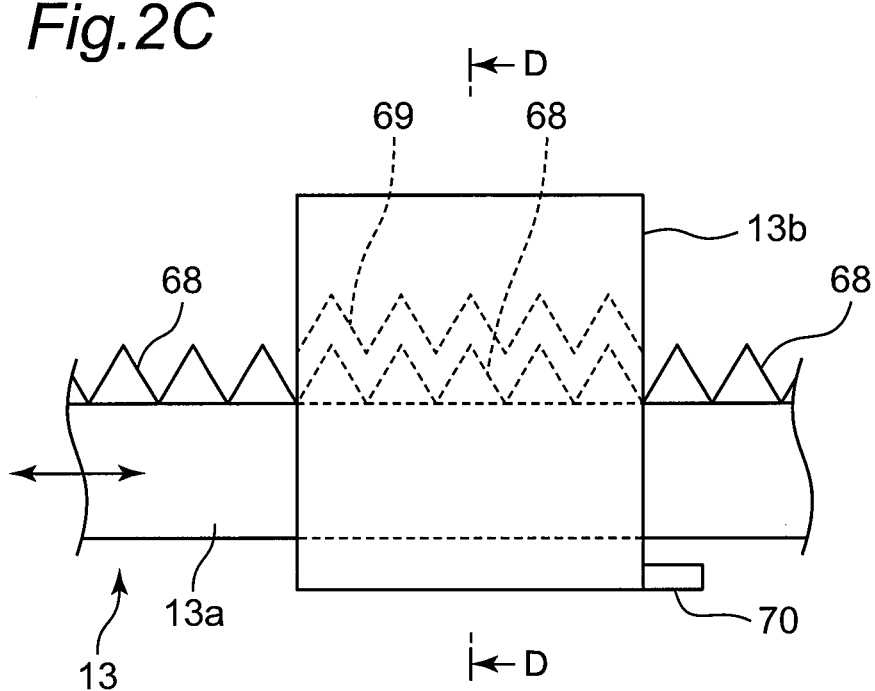
FIG. 2C is an enlarged plan view showing, with dotted lines, a state where a slide rail of the hand manipulation mechanism is engaged with a manipulation portion supporter in the first embodiment.
Figure 2D:
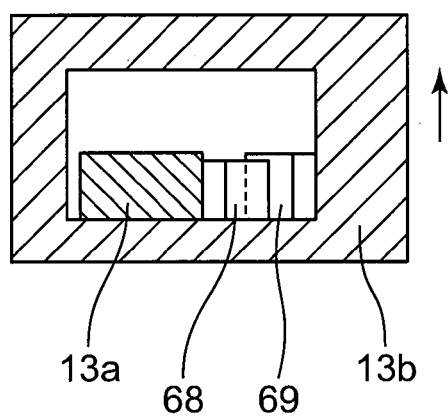
FIG. 2D is a sectional view taken along line D-D indicated in FIG. 2C, showing a state where a slide ratchet portion is engaged with a slide bearing ratchet portion in the first embodiment.
Figure 2E:
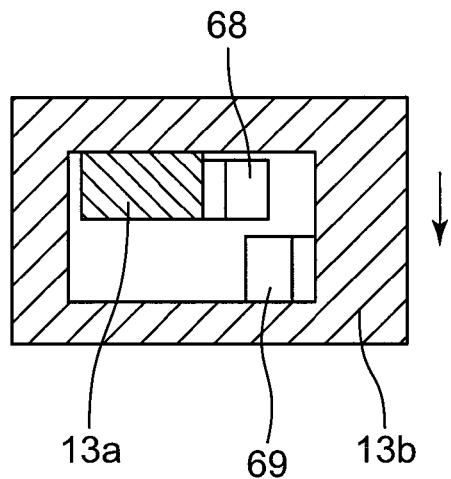
FIG. 2E is a sectional view taken along line D-D indicated in FIG. 2C, showing a state where the slide ratchet portion is disengaged from the slide bearing ratchet portion in the first embodiment.
Figure 3:
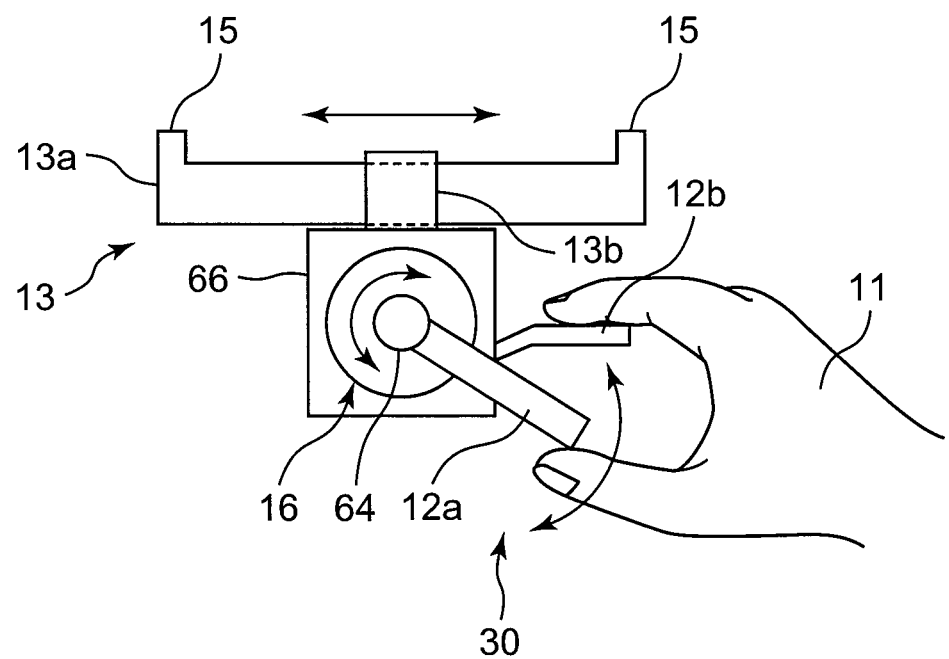
FIG. 3 is a plan view of the hand manipulation mechanism gripped by an operator in the first embodiment.
Figure 4A:
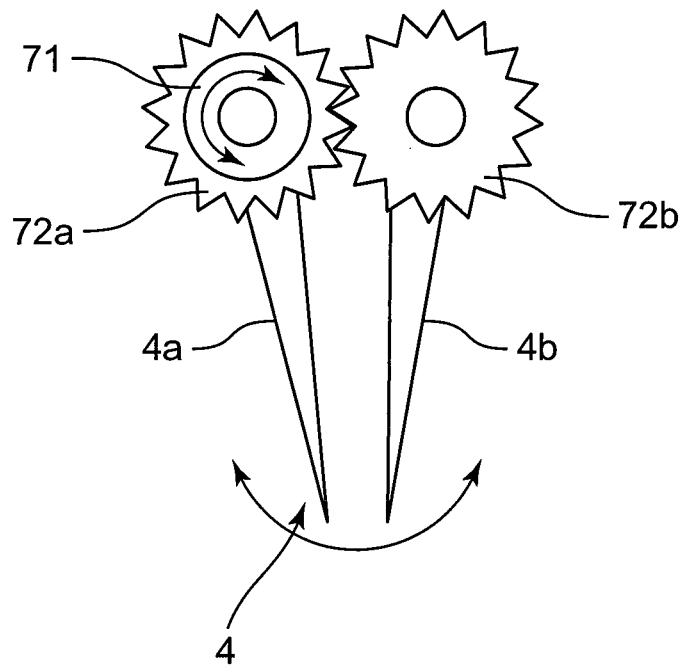
FIG. 4A is a top plan view of a slave hand mechanism according to the first embodiment.
Figure 4B:
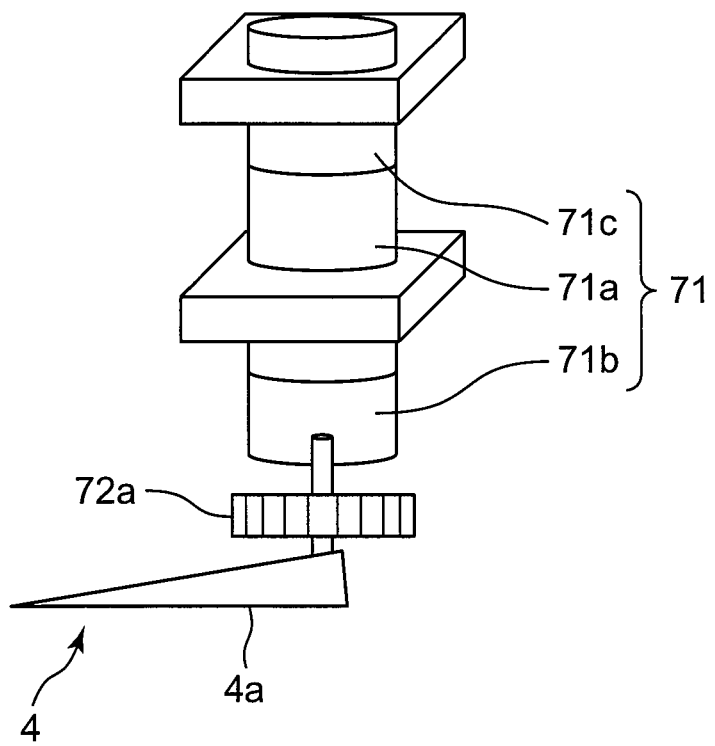
FIG. 4B is a perspective side view of the slave hand mechanism according to the first embodiment.

FIG. 2A is a top plan view of the master hand manipulation mechanism 30. FIG. 2B is a perspective side view of the hand manipulation mechanism 30. FIG. 2C is an enlarged plan view showing, with dotted lines, a state where the slide rail 13a is engaged with the manipulation portion supporter 13b in the hand manipulation mechanism 30. FIG. 2D is a sectional view taken along line D-D indicated in FIG. 2C, showing a state where a slide ratchet portion 68 is engaged with a slide bearing ratchet portion 69. FIG. 2E is a sectional view taken along line D-D indicated in FIG. 2C, showing a state where the slide ratchet portion 68 is disengaged from the slide bearing ratchet portion 69. FIG. 3 is a plan view of the hand manipulation mechanism 30 gripped by the operator 11. FIG. 4A is a top plan view of the slave hand mechanism 4, and FIG. 4B is a perspective side view of the slave hand mechanism 4.

In this example, the hand manipulation portion 12 includes the pair of open/close manipulation portions 12a and 12b, such as a hand movable manipulation portion 12a and a hand fixed manipulation portion 12b each of which has a bar shape. The hand movable manipulation portion 12a is a member that has an end coupled to a motor bearing 64 to be described later and is turned when the operator 11 manipulates with a finger(s). The hand fixed manipulation portion 12b is a member that is coupled to a motor top fixing portion 66 and fixes a finger(s) of the operator 11 who manipulates the hand manipulation portion 12.

The slide rail 13a is a member sliding inside the cylindrical manipulation portion supporter 13b, and has a side surface provided with the slide ratchet portion 68 that has chevron teeth. The hand manipulation portion 12 according to the first embodiment can optionally have a ratchet structure that can be set so as to be stepwisely moved forward and smoothly moved backward relatively to the slider 13.

The manipulation portion supporter 13b is a cylindrical member that has an inner side surface provided with the slide bearing ratchet portion 69 having the chevron teeth, serves as a slide bearing, and is fixed to a side surface of the motor top fixing portion 66. The slide rail 13a is slidable inside the manipulation portion supporter 13b and the slide ratchet portion 68 is engaged with the slide bearing ratchet portion 69, so that the slide rail 13a is fixed to the manipulation portion supporter 13b so as to be immovable in a slide axis direction. When the slide ratchet portion 68 is disengaged from the slide bearing ratchet portion 69, the slide rail 13a is freely movable in the slide axis direction relatively to the manipulation portion supporter 13b. The slide ratchet portion 68 can be engaged with and disengaged from the slide bearing ratchet portion 69 in the following manners, for example. As shown in FIG. 2D, these portions can be engaged with each other when the manipulation portion supporter 13b is shifted upward relatively to the slide rail 13a and the slide bearing ratchet portion 69 is shifted so as to face the slide ratchet portion 68. As shown in FIG. 2E, these portions can be disengaged from each other when the manipulation portion supporter 13b is shifted downward relatively to the slide rail 13a from the state shown in FIG. 2D and the slide bearing ratchet portion 69 is shifted relatively to the slide ratchet portion 68 so as not to face the slide ratchet portion 68.

The slide rail 13a is provided, at both ends, with stoppers 15. The stoppers 15 stop slide motion of the manipulation portion supporter 13b along the slide rail 13a so as to limit the shift range of the manipulation portion supporter 13b.

A slide position acquiring sensor 70 is a sensor that functions as one example of a slide position acquiring unit such as a magnetic sensor, and is fixed to the manipulation portion supporter 13b near the slide rail 13a to acquire a slide position (a position of the hand manipulation portion 12 relative to an end of the master mechanism 29, in other words, the slide position of the hand manipulation portion 12 relative to (a coupling end with the master mechanism of) the slide rail 13a of the slider 13) of the manipulation portion supporter 13b relative to the slide rail 13a. The slide position acquiring sensor 70 acquires a position (slide position) of the hand manipulation portion 12 relative to the slider 13 every sample period counted by a timer 43B when the operator 11 moves the hand manipulation portion 12 and the slider 13. The slide position acquiring sensor 70 transmits the position thus acquired to a master hand controller 22.

The hand movable manipulation portion 12a is coupled to a master motor unit 16 by way of the motor bearing 64. The master motor unit 16 includes a motor 18, a gear 17, and an encoder 19. The motor 18 turns positively or negatively the hand movable manipulation portion 12a or applies resistance against the turn. The gear 17 is coupled to a rotary shaft of the motor 18. The encoder 19 measures a rotation angle of the motor 18. The encoder 19 functions as one example of an open/close angle acquiring unit. When a gear ratio between a gear fixed to the rotary shaft of the motor 18 and the gear 17 is increased, the rotary shaft of the motor 18 can be rotated by turning the hand movable manipulation portion 12a even though the motor 18 is not driven. The motor top fixing portion 66 is a member that fixes the top of the motor 18. A motor middle fixing portion 67 is a member that fixes the middle portion of the motor 18.

In this structure, when a finger of the operator 11 is in contact with the hand movable manipulation portion 12a in order to turn the hand movable manipulation portion 12a, a load is applied to the motor 18 by way of the hand movable manipulation portion 12a. It is accordingly possible to detect contact of the finger of the operator 11 who turns the hand movable manipulation portion 12a. When the operator 11 turns the hand movable manipulation portion 12a, it is possible to measure force and a turn angle thereof. When the finger of the operator 11 leaves the hand movable manipulation portion 12a, no load is applied to the motor 18 by way of the hand movable manipulation portion 12a. The motor 18 can be controlled to rotate so that the hand movable manipulation portion 12a is opened to an initial position. The encoder 19 thus acquires an open angle (angle information) between the pair of open/close manipulation portions 12a and 12b of the hand manipulation portion 12 every sample period counted by the timer 43B when the operator 11 moves the hand manipulation portion 12 and the slider 13. The encoder 19 transmits the open angle thus acquired to the master hand controller 22. Alternatively, the hand movable manipulation portion 12a can be constantly biased toward the opened initial position by a spring member or the like.

The hand mechanism 4 is configured as follows.

The hand mechanism 4 is coupled to an end of the robot arm exemplifying the slave mechanism 41, and opens or closes the pair of open/close members 4a and 4b of the hand mechanism 4 in compliance with open/close motion of the hand movable manipulation portion 12a and the hand fixed manipulation portion 12b of the hand manipulation portion 12, so as to grip the component 5 or the like.

The pair of open/close members 4a and 4b of the hand mechanism 4 is opened or closed by a slave motor unit 71. The slave motor unit 71 includes a motor 71a, a gear 71b, and an encoder 71c. The motor 71a turns one of the open/close members 4a. The gear 71b is coupled to a rotary shaft of the motor 71a. The encoder 71c measures a rotation angle of the motor 71a. The pair of open/close members 4a and 4b configuring the tweezers has proximal ends that are fixed to a gear wheel 72a and a gear wheel 72b, respectively. The gear 71b has a rotary shaft to which the gear wheel 72a and the open/close member 4a are fixed. The gear wheel 72a is meshed with the gear wheel 72b. When the motor 71a is driven to rotate positively or negatively, the gear wheel 72a and the open/close member 4a turn positively or negatively by way of the gear 71b and the gear wheel 72b meshed with the gear wheel 72a and the open/close member 4b turn positively or negatively. The pair of open/close members 4a and 4b is accordingly opened or closed when the motor 71a is driven to rotate positively or negatively.

The hand mechanism 4 has the force measurement device 1. The force measurement device 1 measures force relevant to the slave robot 2, and includes a force detector 50 and a gripping force detector 55.

The force detector 50 in the force measurement device 1 functions as one example of a force information acquiring unit for acquiring information on force externally applied to the slave mechanism 41, is located at a wrist of the hand mechanism 4, and measures force applied from the component 5 to the board 7 or the insertion port 6. The force detector 50 is to be detailed later. The gripping force detector 55 in the force measurement device 1 functions as one example of a gripping force information acquiring unit for acquiring information on gripping force of the hand mechanism 4 gripping the target object 5, is located at the hand mechanism 4, and measures gripping force of the hand mechanism 4 gripping the component 5. The gripping force detector 55 is to be detailed later.

The workbench 9 is provided, on a side, with an imaging device 14 such as a camera that images the component 5 or the insertion port 6, and a monitor 10a displays an imaged video picture.

The slave robot 2 moves when the operator 11 manipulates the master robot 3 while checking on the monitor 10a the video picture imaged by the imaging device 14. The operator 11 manipulates to open or close the hand manipulation portion 12 located at the distal end of the master robot 3, so as to move to open or close the hand mechanism 4 located at the distal end of the slave robot 2.

The master hand control device 23 causes the force detector 50 in the slave robot 2 to feed back, to the master robot 3 by way of the database input/output unit 45, force measured by the force detector 50 in the force measurement device 1. The operator 11 is accordingly capable of causing the slave hand control device 31 to move the slave robot 2 as if the operator 11 directly manipulates the component 5. Gripping force of the hand mechanism 4 opened or closed to grip the component 5 is fed back to the hand manipulation portion 12 of the master robot 3 by way of the slave hand control device 31 and the master hand control device 23. The operator is accordingly capable of performing the task while sensing gripping force.

A manipulation procedure of the master slave apparatus 100 is schematically described with reference to FIGS. 5A to 5G and 6A to 6G.

When the operator 11 manipulates the master robot 3 and the hand manipulation portion 12, the slave robot 2 is shifted in accordance with force applied by the operator 11 to insert the component 5 into the insertion port 6. Assume that a control information setting unit 20 initially sets the mode of the hand manipulation portion 12 into the shift mode. In the shift mode, when the hand manipulation portion 12 is manipulated relatively to the slider 13, a position of the distal end of the slave mechanism 41 (in other words, the hand mechanism 4 or the tweezers themselves) is shifted slightly.

Figure 5A:
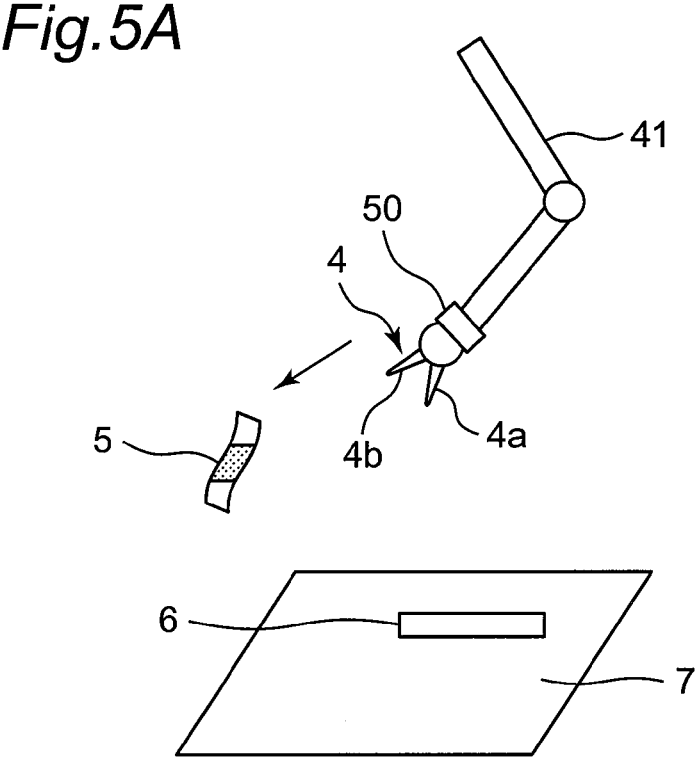
FIG. 5A is an explanatory view of component inserting manipulation of a slave mechanism in a shift mode according to the first embodiment of the present invention.
Figure 6A:
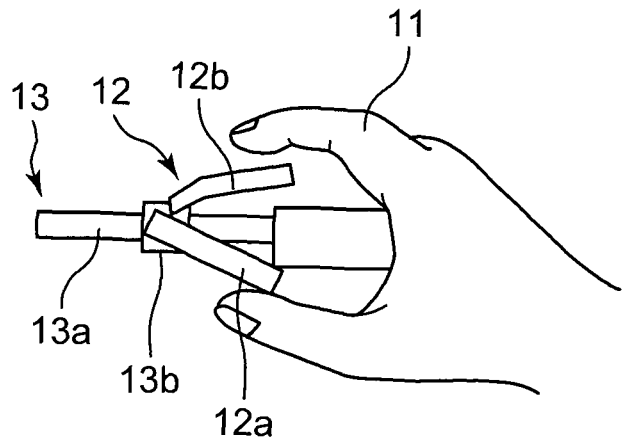
FIG. 6A is an explanatory view of component inserting manipulation of a master mechanism in the shift mode according to the first embodiment of the present invention.

More specifically, the operator 11 grips the master robot 3 and the hand manipulation portion 12 and moves and largely shifts the master robot 3 as shown in FIG. 6A, so that the slave robot 2 largely shifts toward the component 5 as shown in FIG. 5A. At this stage, the operator 11 simply touches with fingers the pair of open/close manipulation portions 12a and 12b of the hand manipulation portion 12 and does not open/close or slide the pair of open/close manipulation portions 12a and 12b relatively to the slider 13.

Figure 5B:
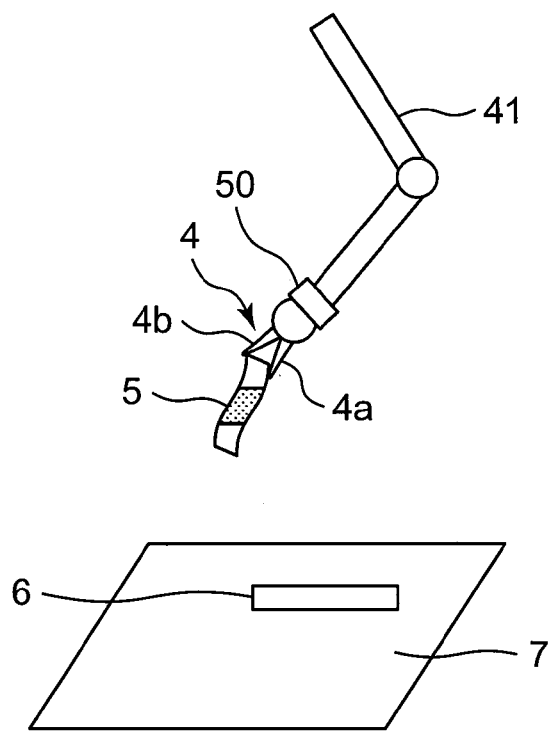
FIG. 5B is an explanatory view of the component inserting manipulation of the slave mechanism in the shift mode according to the first embodiment of the present invention.
Figure 6B:
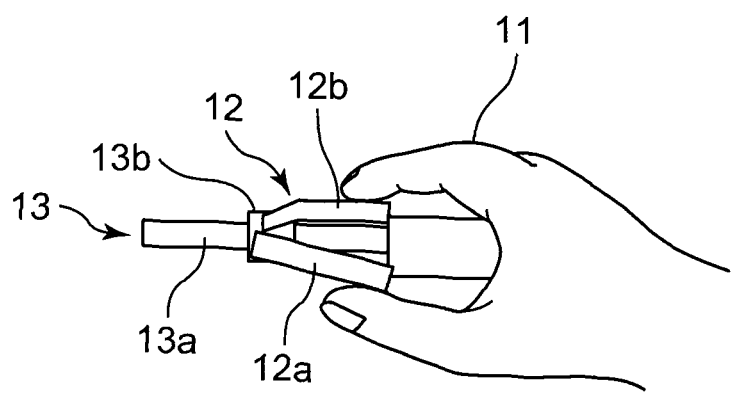
FIG. 6B is an explanatory view of the component inserting manipulation of the master mechanism in the shift mode according to the first embodiment of the present invention.
Figure 6C:
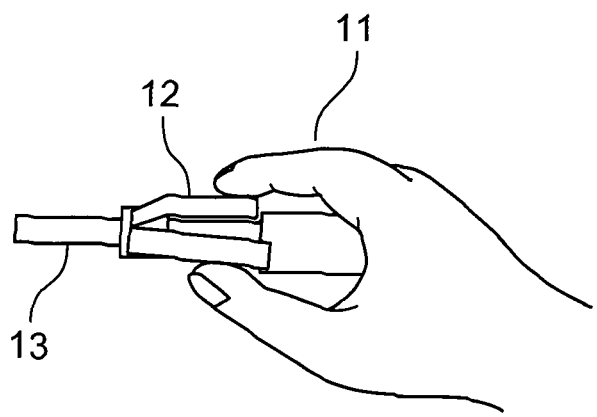
FIG. 6C is an explanatory view of the component inserting manipulation of the master mechanism in the shift mode according to the first embodiment of the present invention.

Subsequently, when the operator 11 moves to close with the fingers the hand movable manipulation portion 12a toward the hand fixed manipulation portion 12b so as to close the hand manipulation portion 12 as shown in FIGS. 6B and 6C, the hand mechanism 4 of the slave robot 2 is closed and the pair of open/close members 4a and 4b grips the component 5 as shown in FIGS. 5B and 5C. The gripping force detector 55 measures gripping force applied to the gripped component 5 and feeds backs to the hand manipulation portion 12 by way of the master hand control device 23. Under the control of the master hand control device 23, the operator 11 is capable of adjusting a level of force of gripping the hand manipulation portion 12 while sensing gripping force at the hand manipulation portion 12.

Figure 6D:
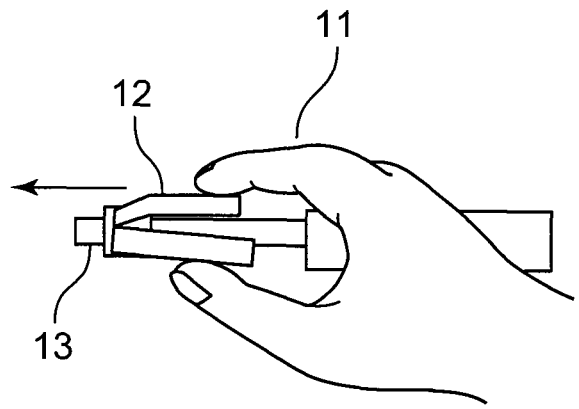
FIG. 6D is an explanatory view of the component inserting manipulation of the master mechanism in the shift mode according to the first embodiment of the present invention.
Figure 6E:
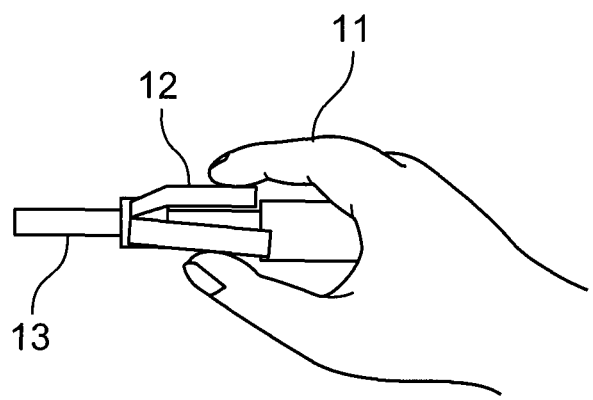
FIG. 6E is an explanatory view of component inserting manipulation of the master mechanism in the reset mode according to the first embodiment of the present invention.
Figure 6F:
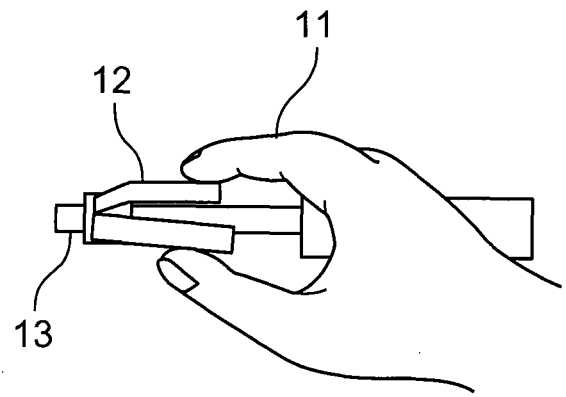
FIG. 6F is an explanatory view of component inserting manipulation of the master mechanism in the force mode according to the first embodiment of the present invention.
Figure 6G:
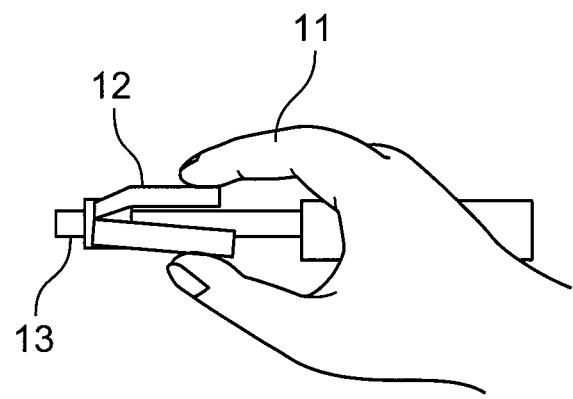
FIG. 6G is an explanatory view of the component inserting manipulation of the master mechanism in the force mode according to the first embodiment of the present invention.

The operator 11 then manipulates to largely shift the master robot 3 so that the component 5 gripped by the slave robot 2 largely shifts toward the insertion port 6. As shown in FIG. 6D, in order to finely adjust a position, a direction, or the like of the component 5 relative to the insertion port 6, the hand manipulation portion 12 is slid forward on the slider 13 (toward the distal end) (so as to be distant from the edge of the end of the master mechanism 29) relatively to the slider 13. Because of the shift mode, the slave robot 2 is shifted only by a slide amount of the hand manipulation portion 12 under the control of the master hand control device 23 and the slave hand control device 31 (FIG. 5F), so that the slave robot 2 is finely adjusted.

The control information setting unit 20 then switches the mode of the hand manipulation portion 12 from the shift mode into the force mode as described later. In the force mode, a gripped position of the tweezers is changed. The tweezers are gripped at a position near the distal ends when the operator 11 desires to finely operate the tweezers. The tweezers are gripped at a position near the rear end thereof when the operator 11 desires to roughly operate the tweezers. In the shift mode, the hand mechanism 4 at the distal end of the slave robot 2 can be shifted by a shift amount smaller than a shift amount for a case where the hand manipulation portion 12 and the slider 13 are shifted integrally. For example, when the hand manipulation portion 12 and the slider 13 are integrally shifted along with the master robot 3, the hand mechanism 4 at the distal end of the slave robot 2 can be normally shifted by 1 mm if the master robot 3 is shifted by 10 mm. In contrast, when the hand manipulation portion 12 is shifted relatively to the slider 13, the hand mechanism 4 at the distal end of the slave robot 2 can be shifted by 0.5 mm for fine adjustment. In an example, a shift scale is set between the master robot 3 and the slave robot 2 so that the slave robot 2 is shifted by 1 mm when the master robot 3 is shifted by 10 mm.

When the control mode is switched between the shift mode and the force mode, a slide position needs to be reset. The operator 11 thus presses the reset button 82 provided to the robot arm of the master robot 3, and the hand manipulation portion 12 located at the distal end on the slider 13 is manually returned to the initial position near the rear end on the slider 13, for example, from the state shown in FIG. 6D to the state shown in FIG. 6E (e.g. same as the state shown in FIG. 6C). This returning motion is not regarded as motion to be controlled. It is thus necessary to set a reset mode for temporarily stopping control operation. The reset button 82 is provided to set the reset mode and functions as one example of a reset mode setting unit.

The initial position can be arbitrarily located as long as the hand manipulation portion 12 is returned by a certain distance from the position near the distal end toward the rear end relatively to the slider 13 to secure a shift amount for shifting toward the distal end.

Figure 5E:
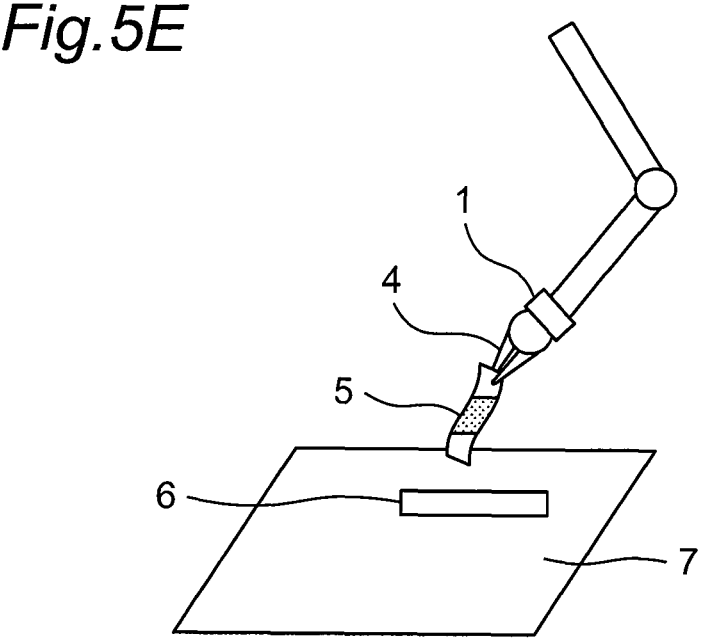
FIG. 5E is an explanatory view of component inserting manipulation of the slave mechanism in a reset mode according to the first embodiment of the present invention.
Figure 5F:
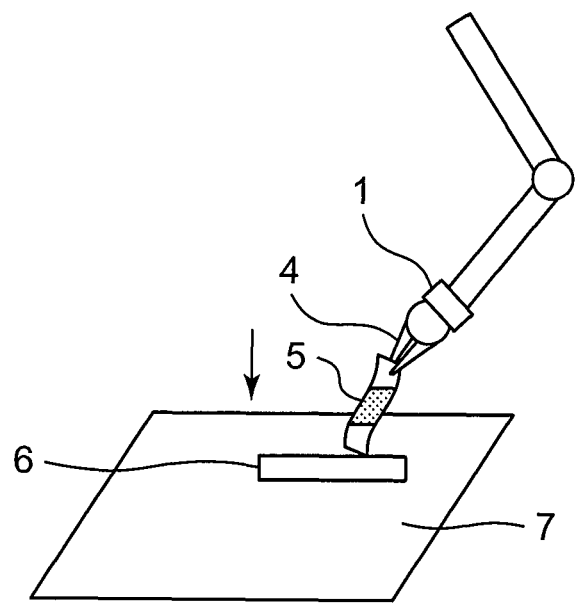
FIG. 5F is an explanatory view of component inserting manipulation of the slave mechanism in a force mode according to the first embodiment of the present invention.
Figure 5G:
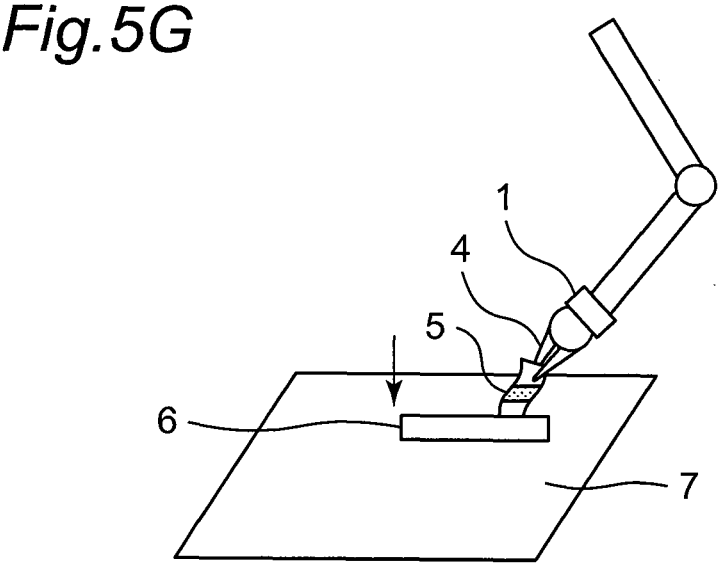
FIG. 5G is an explanatory view of the component inserting manipulation of the slave mechanism in the force mode according to the first embodiment of the present invention.

When information on the ON state of the pressed reset button 82 is transmitted to the control information setting unit 20 by way of the database input/output unit 45, the reset mode is set for temporarily stopping control operation so that a slide position is reset upon switching the control mode between the shift mode and the force mode. More specifically, for example, no control operation is performed on the motion of returning the hand manipulation portion 12 to the initial position relatively to the slider 13 during a certain period after the reset button 82 is pressed. FIGS. 5D and 5E thus show the identical state.

Figure 5H:
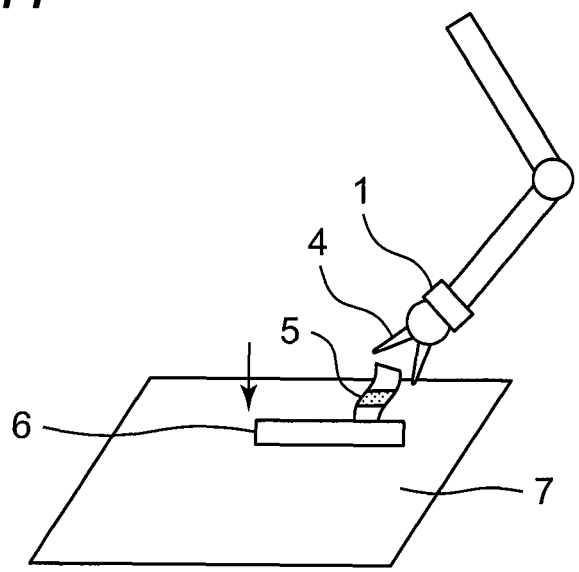
FIG. 5H is an explanatory view of the component inserting manipulation of the slave mechanism in the force mode according to the first embodiment of the present invention.
Figure 6H:
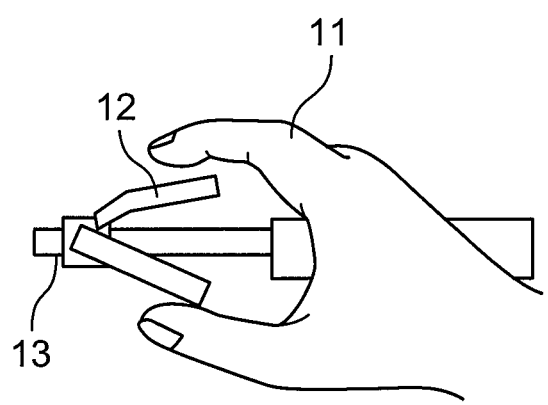
FIG. 6H is an explanatory view of the component inserting manipulation of the master mechanism in the force mode according to the first embodiment of the present invention.

In the force mode, as shown in FIGS. 5F to 5G and 6F and 6G, the operator 11 is capable of manipulating as if actually gripping the distal ends or rear portions of the tweezers in order to insert the component 5 into the insertion port 6. More specifically, under the control of the master hand control device 23, fed back force of force applied to the component 5 is changed and fed back in accordance with a slide position of the hand manipulation portion 12 relative to the slider 13. When the insertion is completed, the hand manipulation portion 12 is opened as shown in FIG. 6H so that the hand mechanism 4 is opened to release the component 5 as shown in FIG. 5H.

Figure 7A:
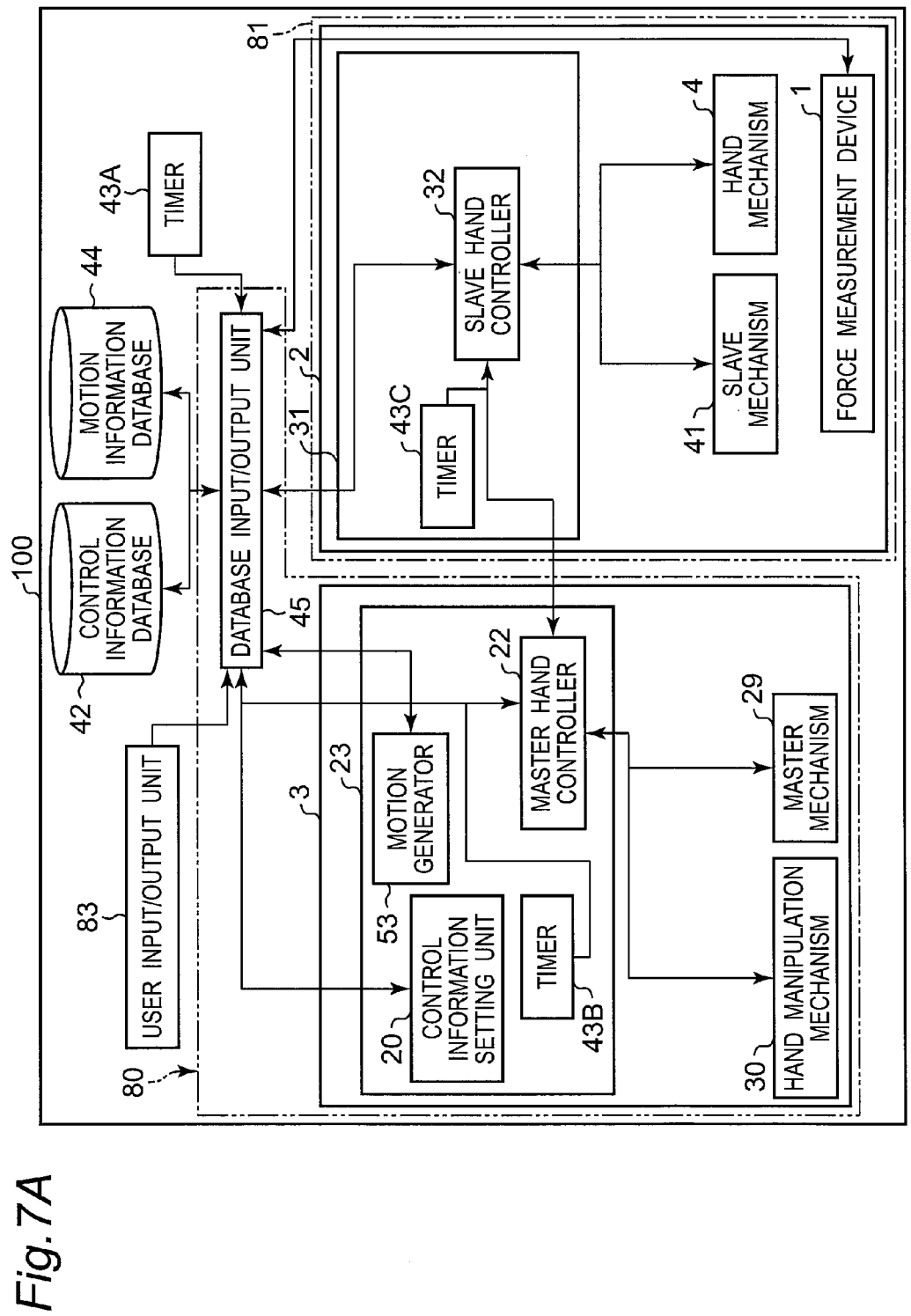
FIG. 7A is a block diagram of a detailed configuration of the master slave apparatus according to the first embodiment of the present invention.
Figure 7B:
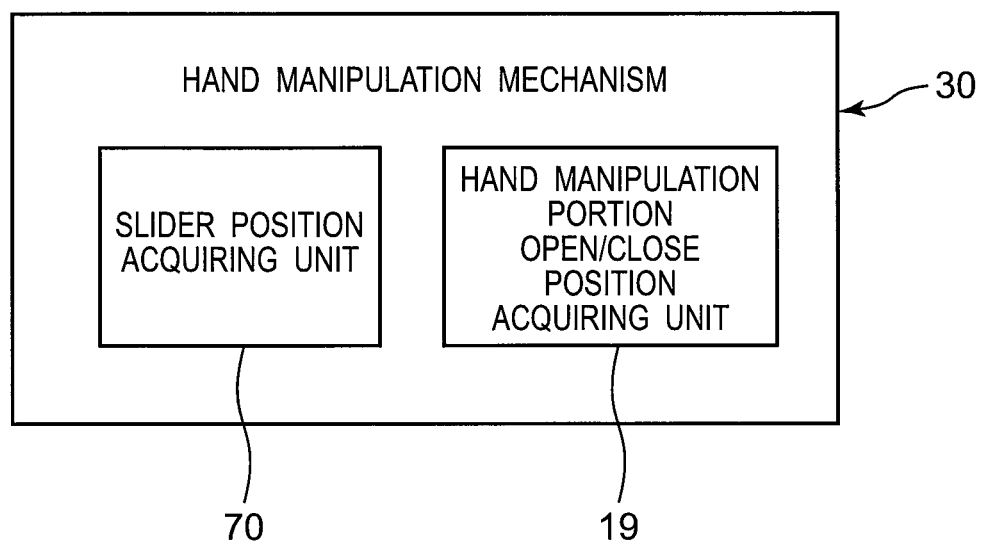
FIG. 7B is a block diagram of a detailed configuration of the hand manipulation mechanism in the master slave apparatus according to the first embodiment of the present invention.
Figure 8:
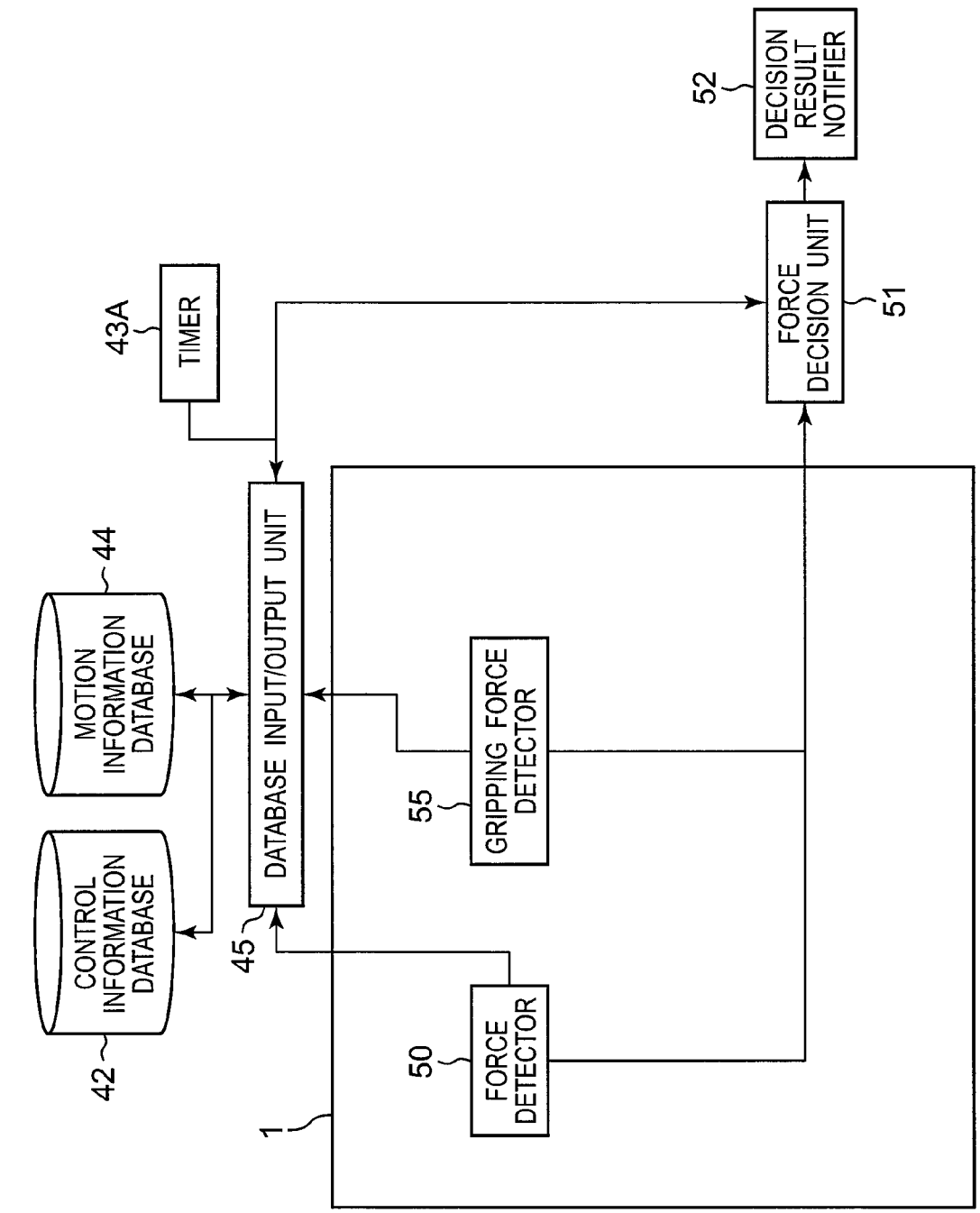
FIG. 8 is a block diagram of a detailed configuration of a force measurement device according to the first embodiment of the present invention.

Described in detail next are the master robot 3, the slave robot 2, and the force measurement device 1 in the master slave apparatus 100 according to the first embodiment. FIG. 7A is a configuration view showing the master robot 3, the slave robot 2, the force measurement device 1, the motion information database 44, the control information database 42, a timer 43A, and the database input/output unit 45. FIG. 8 is a detailed configuration view of the force measurement device 1. FIG. 7B is a block diagram of the detailed configuration of the hand manipulation mechanism 30.

<<Force measurement Device 1>>

The force measurement device 1 according to the first embodiment is a device that acquires force information relevant to the slave robot 2 and the hand mechanism 4, and includes the force detector 50 and the gripping force detector 55. Separately from the force measurement device 1, the master device 80 includes a force decision unit 51 and a decision result notifier 52. The force measurement device 1 can alternatively include the force decision unit 51 and the decision result notifier 52.

<<Force Detector 50>>

As shown in FIG. 1, the force detector 50 is located between the slave robot 2 and the hand mechanism 4 at a position corresponding to the wrist of the hand mechanism 4, and measures force of the slave robot 2 in contact with an external object (e.g. force applied from the component 5 to the board 7 or the insertion port 6 in the task mentioned above) (force information). Specific examples of the force detector 50 include a force sensor that is capable of measuring hexaxially, and a triaxial force sensor that is capable of measuring only positional directions. Force measured by the force detector 50 is transmitted from the force detector 50 to the motion information database 44 by way of the database input/output unit 45.

<<Gripping Force Detector 55>>

Figure 9:
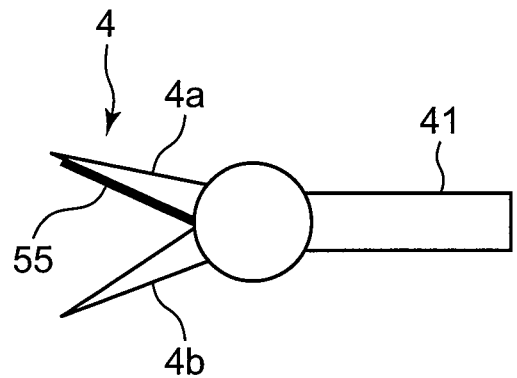
FIG. 9 is an explanatory view of a grip force detector according to the first embodiment of the present invention.

As shown in FIG. 9, the gripping force detector 55 is located at one of the open/close members (e.g. 4a) of the hand mechanism 4, and measures gripping force of the hand mechanism 4 gripping the target object such as the component 5 (e.g. gripping force of the hand mechanism 4 when the pair of open/close members 4a and 4b grips the component 5 in the task mentioned above) (gripping force information). Specific examples of the gripping force detector 55 include a uniaxial strain sensor. Gripping force measured by the gripping force detector 55 is transmitted from the gripping force detector 55 to the motion information database 44 by way of the database input/output unit 45.

<<Timer 43A>>

The timer 43A transmits, to the database input/output unit 45, a command for operating the database input/output unit 45, the slave hand controller 32, and the master hand controller 22 after elapse of a certain period (e.g. every 1 msec).

<<Force Decision Unit 51>>

The force decision unit 51 determines that a load is applied to the component 5 or the like if force detected by the force detector 50 or the gripping force detector 55 is equal to or more than a predetermined threshold (e.g. 5 N). The force decision unit 51 transmits decision result as well as force information used for the decision to the decision result notifier 52. The force decision unit 51 also transmits the decision result to the motion information database 44 by way of the database input/output unit 45.

<<Decision Result Notifier 52>>

Figure 10A:
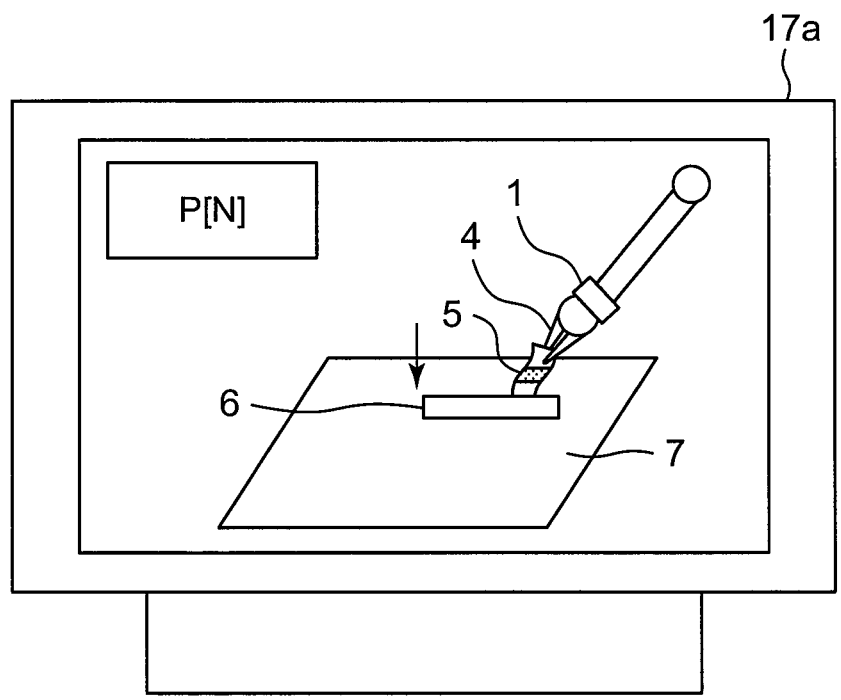
FIG. 10A is an explanatory view exemplifying a decision result notifier according to the first embodiment of the present invention.
Figure 10B:
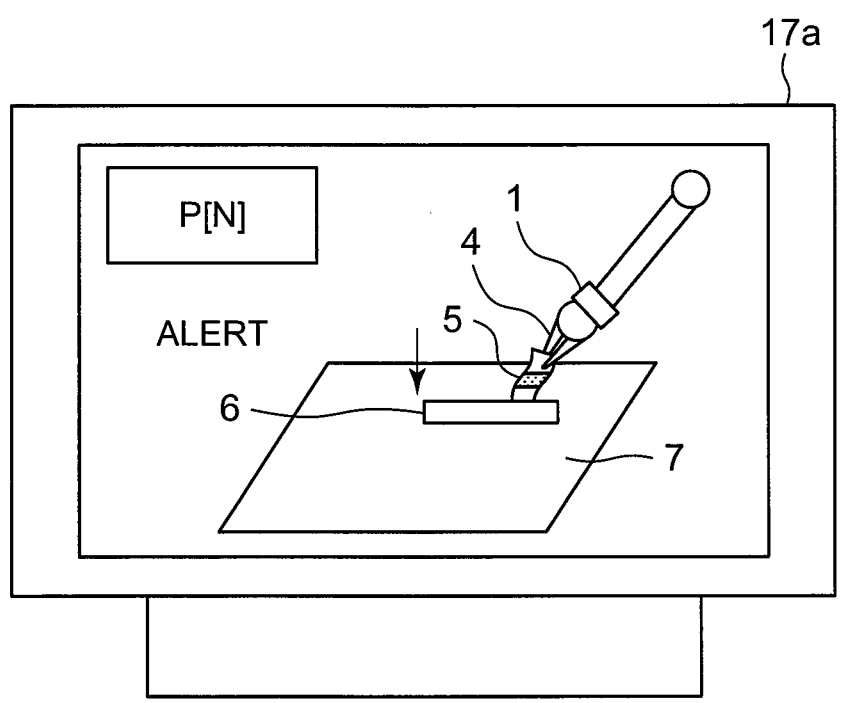
FIG. 10B is an explanatory view exemplifying the decision result notifier according to the first embodiment of the present invention.

The decision result notifier 52 is a device that notifies the operator 11 of the decision result made by the force decision unit 51, and includes a monitor, a speaker, or the like. More specifically, the decision result notifier 52 displays, using the monitor 10a shown in FIG. 10A, detected force P [N] together with a video picture of the slave robot 2 and the vicinity thereof. If the force decision unit 51 decides that a load is applied, the decision result notifier 52 displays a caution such as "ALERT" shown in FIG. 10B.

When the force decision unit 51 decides that a load is applied, the decision result notifier 52 cautions the operator 11 by causing a speaker 10b shown in FIG. 1 to output alarm sound.

<<Master Mechanism 29 and Slave Mechanism 41>>

The master mechanism 29 is a robot directly touched and manipulated by the operator 11, and acquires position information every sample period while being moved by the operator 11 to transmit the position information to the master hand controller 22. The master hand controller 22 controls motion of the master mechanism 29 in compliance with force information and gripping force information measured by the force measurement device 1.

The slave mechanism 41 is a robot for performing the task of inserting the component 5 into the insertion port 6, and acquires position information on the slave mechanism 41 every period to transmit the position information to the master hand controller 22. The master hand controller 22 controls motion of the slave mechanism 41 in compliance with generated position information that is generated by a motion information generator 53 in accordance with the position information acquired by the master mechanism 29.

<<Control Information Setting Unit 20>>

The control information setting unit 20 switches motion of the slave robot 2 and the master robot 3 when the hand manipulation portion 12 is slid relatively to the slider 13. When the hand manipulation portion 12 is slid relatively to the slider 13, in the shift mode for controlling a position in an approach direction such as an insertion direction of the slave robot 2, the control information setting unit 20 sets "0" as the control mode for the hand manipulation portion 12. When the hand manipulation portion 12 is slid relatively to the slider 13, in the force mode for changing fed back force to the master robot 3 or the like, the control information setting unit 20 sets "1" as the control mode for the hand manipulation portion 12. Either information set by the control information setting unit 20 is transmitted to the control information database 42 by way of the database input/output unit 45.

The control information setting unit 20 further sets a shift gain for control of the slave robot 2 in accordance with a position and an orientation of the master robot 3, and transmits the shift gain to the control information database 42 by way of the database input/output unit 45. If the slave robot 2 is a hexaxial arm, the control information setting unit 20 sets shift gains for six axes in total inclusive of three position axes and three orientation axes.

A "hand angle gain" is a gain for opening or closing the open/close members 4a and 4b of the hand mechanism 4 in accordance with an angle formed by opening or closing the pair of open/close manipulation portions 12a and 12b of the hand manipulation portion 12. The control information setting unit 20 sets the "hand angle gain".

The control information setting unit 20 also sets a force gain for transmission of force detected by the force detector 501 to the master mechanism 29. If the force detector 50 is a hexaxial force sensor, the control information setting unit 20 sets force gains for six axes in total inclusive of three position axes and three orientation axes. The control information setting unit 20 according to the first embodiment sets a force gain. The control information setting unit 20 can alternatively calculate a force gain from a shift gain. More specifically, the control information setting unit 20 calculates a force gain=J× 1/(a shift gain for each axis) for each axis to set the force gain. In this equation, J is a constant. Assuming that the weight of the slave mechanism 41 and the master mechanism 29 are Ms and Mm, respectively, the control information setting unit 20 can determine J=Mm/Ms in accordance with each weight.

Alternatively, the control information setting unit 20 can appropriately determine so that the constant J is not affected by inertia of the slave mechanism 41.

A "gripping force gain" stored in the control information database 42 is for feedback of gripping force of the opened or closed hand manipulation portion 12 to the hand manipulation portion 13. The control information setting unit 20 causes the "gripping force gain" to be stored in the control information database 42.

The control information setting unit 20 according to the first embodiment sets a gripping force gain. The control information setting unit 20 can alternatively calculate a gripping force gain from a hand angle gain. More specifically, the control information setting unit 20 calculates a gripping force gain=l×1/(a hand angle gain) for each axis to set the gripping force gain. In this equation, l is a constant.

The control information setting unit 20 further sets a shift gain in an approach direction such as the insertion direction of the slave robot 2 when a "control mode of hand manipulation portion" column in the control information database 42 includes the shift mode. The shift gain is not used in the "force mode".

Various setting can be preliminarily stored in the control information database 42, or can be inputted to the control information database 42 by the input IF 8 that is located on the side of the workbench 9.

<<Database Input/Output Unit 45>>

The database input/output unit 45 inputs or outputs data (information) to or from the motion information database 44, the control information database 42, the force detector 50, the gripping force detector 55, the force decision unit 51, the control information setting unit 20, the master hand controller 22, the slave hand controller 32, and the motion information generator 53.

—Motion Information Database 44—

Information on force detected by the force detector 50, information on gripping force detected by the gripping force detector 55, position information on the master mechanism 29, angle information on the hand manipulation portion 12, a slide position of the hand manipulation portion 12, generated position information on the slave robot 2 and generated angle information of the hand mechanism 4 generated by the motion information generator 53, force information (generated force information) generated by the motion information generator 53, gripping force information (generated gripping force information) generated by the motion information generator 53, and a decision result of the force decision unit 51 are generated every certain period (e.g. every 1 msec) counted by the timer 43A. These pieces of information thus generated (generated information) as well as time thereof are transmitted to the motion information database 44 by way of the database input/output unit 45 so as to be stored as motion information.

FIG. 11A exemplifies contents of the information stored in the motion information database 44.

(1) A "time" column shows information on the time when the master slave system 100 is in motion. Such information is indicated by the millisecond (msec) unit system in the first embodiment.

(2) A "force" column shows information on force detected by the force detector 50. In the first embodiment, force in an insertion or translation direction is indicated by the newton (N) unit system and force in a rotation direction is indicated by the newton meter (Nm) unit system.

(3) A "gripping force" column shows information on force detected by the gripping force detector 55. Such information is indicated by the newton (N) unit system in the first embodiment.

(4) A "master position" column shows a position and an orientation of the master mechanism 29 detected by an encoder (not shown) or the like provided to the master mechanism 29. In the first embodiment, the position is indicated by the meter (m) unit system and the orientation is indicated by the radian (rad) unit system.

(5) An "angle of hand manipulation portion" column shows an angle of the hand manipulation portion 12. More specifically, the angle shows an open angle $R_m$ between the pair of open/close manipulation portions 12a and 12b of the hand manipulation portion 12 as indicated in FIG. 12. The angle is indicated by the radian (rad) unit system in the first embodiment.

(6) A "position of hand manipulation portion" column shows a slide position in the slide axis direction of the hand manipulation portion 12 relative to the slider 13. The position is indicated by the meter (m) unit system in the first embodiment.

(7) A "slave position" column shows a position and an orientation of the slave mechanism 41 detected by an encoder (not shown) or the like provided to the slave mechanism 41. In the first embodiment, the position is indicated by the meter (m) unit system and the orientation is indicated by the radian (rad) unit system.

(8) A "hand angle" column shows an open angle between the pair of open/close members 4a and 4b of the hand mechanism 4. More specifically, the angle is an open angle $R_s$ between the pair of open/close members 4a and 4b as indicated in FIG. 13. The angle is indicated by the radian (rad) unit system in the first embodiment.

(9) A "force after generation" column shows force information generated by the motion information generator 53 (generated force information). In the first embodiment, forces in an insertion or translation direction are indicated by the newton (N) unit system and force in a rotation direction is indicated by the newton meter (Nm) unit system.

(10) A "gripping force after generation" column shows gripping force information generated by the motion information generator 53 (generated gripping force information). Such information is indicated by the newton (N) unit system in the first embodiment.

(11) A "decision result" column shows a decision result made by the force decision unit 51. The result "0" indicates that no load is applied, whereas the result "1" indicates that a load is applied.

—Control Information Database 42—

The control information setting unit 20 causes information on the mode that is set by the control information setting unit 20 and is switched between the shift mode and the force mode to be stored in the control information database 42 by way of the database input/output unit 45.

The control information database 42 stores a "shift gain" of the slave robot 2 when the master robot 3 is manipulated, a "hand angle gain" of the hand mechanism 4 when the hand manipulation portion 12 is manipulated, a "force gain" for generation of generated force information in accordance with force detected by the force detector 50, a "gripping force gain" for generation of generated gripping force information in accordance with gripping force detected by the gripping force detector 55, and a "slide position gain" as a gain of positional shift in an approach direction such as the insertion direction of the slave robot 2 when the hand manipulation portion 12 is slid relatively to the slider 13.

FIG. 11B exemplifies contents of the information stored in the control information database 42.

(1) In the "control mode of hand manipulation portion" column, "0" is stored in the shift mode or "1" is stored in the force mode when the hand manipulation portion 12 is slid relatively to the slider 13.

(2) In a "shift gain" column, there is stored a shift gain for control of the slave mechanism 41 of the slave robot 2 in accordance with a position and an orientation of the master mechanism 29 of the master robot 3. If the slave mechanism 41 of the slave robot 2 is a hexaxial arm, this column shows shift gains for six axes in total inclusive of three position axes and three orientation axes.

(3) In a "hand angle gain" column, there is stored a gain for opening or closing the pair of open/close members 4a and 4b of the hand mechanism 4 in accordance with an angle formed by opening or closing the pair of open/close manipulation portions 12a and 12b of the hand manipulation portion 12.

(4) In a "force gain" column, there is stored a force gain for transmission of force measured by the force measurement device 1 to the master mechanism 29. If the force measurement device 1 is a hexaxial force sensor, this column shows force gains for six axes in total inclusive of three position axes and three orientation axes.

(5) In a "gripping force gain" column, there is stored a gripping force gain for feedback to the hand manipulation portion 12 of gripping force upon opening or closing the pair of open/close manipulation portions 12a and 12b of the hand manipulation portion 12.

(6) In a "slide position gain" column, there is stored a shift gain in an approach direction such as the insertion direction of the slave robot 2 when the "control mode of hand manipulation portion" column shows the shift mode. The shift gain is not used in the "force mode".

<<Master Hand Control Device 23>>

The master hand control device 23 includes the master hand controller 22 for controlling the master mechanism 29 and the hand manipulation mechanism 30, the control information setting unit 20 for setting control information, the timer 43B for transmitting time information to the master hand controller 22, and the motion generator 53 for generating motion information (generated position information and generated angle information) on the slave robot 2. The master hand control device 23 transmits, to the slave hand control device 31 of the slave mechanism, motion information (generated position information and generated angle information) used for manipulating the hand mechanism 4 in accordance with slide positions of the pair of open/close manipulation portions 12a and 12b relative to the slider 13 or an angle between the pair of open/close manipulation portions 12a and 12b.

Information is transmitted between the master mechanism 29 and the master hand control device 23. More specifically, position information at the master mechanism 29 is transmitted from the master mechanism 29 to the master hand controller 22. Position information at the master hand controller 22 is transmitted from the master hand controller 22 to the master mechanism 29 every certain period (e.g. every 1 msec) counted by the timer 43B, so that motion of the master mechanism 29 is controlled. The master hand controller 22 causes a motor (not shown) provided in the master mechanism 29 to be driven in compliance with position information at the master hand controller 22. A rotation angle of the motor (not shown) provided in the master mechanism 29 is detected by an encoder (not shown) or the like, so that the master hand controller 22 performs feedback control.

Information is transmitted also between the hand manipulation mechanism 30 and the master hand control device 23. More specifically, the hand manipulation mechanism 30 transmits, to the master hand controller 22, information on an angle between the pair of open/close manipulation portions 12a and 12b of the hand manipulation portion 12 and information on a slide position of the hand manipulation portion 12 relative to the slider 13 in the hand manipulation mechanism 30. Angle information and gripping force information at the master hand controller 22 are transmitted to the hand manipulation mechanism 30 every certain period (e.g. every 1 msec) counted by the timer 43B, so that motion of the hand manipulation mechanism 30 is controlled. The master hand controller 22 causes the motor 18 (see FIG. 2B) of the hand manipulation mechanism 30 to move in compliance with angle information and gripping force information at the master hand controller 22.

In summary, the master hand control device 23 transmits every certain period (e.g. every 1 msec), to the slave hand control device 31, (i) position information on the master mechanism 29, (ii) angle information on the hand manipulation portion 12, and (iii) a slide position of the hand manipulation portion 12 relative to the slider 13.

Furthermore, the slave hand control device 31 transmits force to the operator 11 in accordance with received force information or gripping force information and the mode stored in the control information database 42. For example, such force can be transmitted to the operator 11 by driving the motor 18 in the hand manipulation mechanism 30 to positively or negatively turn the hand movable manipulation portion 12a and thus increase or decrease a load applied to the finger of the operator 11.

The timer 43B transmits, to the master hand controller 22, a command for operating the master hand controller 22 after elapse of a certain period (e.g. every 1 msec).

<<Slave Hand Control Device 31>>

The slave hand control device 31 includes the slave hand controller 32 for controlling motion of the hand mechanism 4 and the slave mechanism 41, and a timer 43C for transmitting time information to the slave hand controller 32. The slave hand controller 32 receives, from the master hand controller 22, motion information (generated information) used for manipulating the hand mechanism 4, and controls motion of the slave mechanism 41 and the hand mechanism 4 in accordance with the motion information (generated information).

Information is transmitted between the slave mechanism 41 and the slave hand control device 31. More specifically, position information at the slave hand controller 32 is transmitted from the slave hand controller 32 to the slave mechanism 41. Position information at the slave mechanism 41 serving as motion information used for controlling the slave mechanism 41 is transmitted from the slave mechanism 41 to the slave hand controller 32 every certain period (e.g. every 1 msec) counted by the timer 43C, so that motion of the slave mechanism 41 is controlled. The slave hand controller 32 causes a motor (not shown) provided in the slave mechanism 41 to be driven in compliance with position information received from the slave hand controller 32. A rotation angle of the motor (not shown) provided in the slave mechanism 41 is detected by an encoder (not shown) or the like in the slave mechanism 41 and the slave hand controller 32 performs feedback control.

Information is transmitted also between the hand mechanism 4 and the slave hand control device 31. More specifically, angle information at the slave hand controller 32 is transmitted from the slave hand controller 32 to the hand mechanism 4. Angle information at the hand mechanism 4 serving as motion information used for controlling the hand mechanism 4 is transmitted from the hand mechanism 4 to the slave hand controller 32 every certain period (e.g. every 1 msec) counted by the timer 43C, so that motion of the hand mechanism 4 is controlled. The slave hand control device 31 controls motion of the motor 71a (see FIG. 4B) of the hand mechanism 4 in compliance with angle information at the slave hand controller 32.

More specifically, the slave hand control device 31 causes the motion information generator 53 to generate generated position information and generated angle information on the slave mechanism 41 and the hand mechanism 4 in accordance with the position information on the master mechanism 29, the angle information on the hand manipulation portion 12, and a slide position of the hand manipulation portion 12 relative to the slider 13, which are stored in the motion information database 44, as well as the information stored in the control information database 42. Furthermore, the slave mechanism 41 and the hand mechanism 4 are caused to move in compliance with the generated position information and the generated angle information which are generated by the motion information generator 53. The motion information generator 53 further generates generated force information and generated gripping force information in accordance with force information and gripping force information acquired by the force measurement device 1 and the information in the control information database 42, and transmits the generated force information and the generated gripping force information thus generated to the master hand control device 23 by way of the slave hand controller 32.

The timer 43C transmits, to the slave hand control device 31, a command for operating the slave hand control device 31 after elapse of a certain period (e.g. every 1 msec).

<<Motion Information Generator 53>>

The motion information generator 53 generates information on positions and angles of the slave mechanism 41 and the hand mechanism 4 (generated position information and generated angle information) in accordance with the position information on the master mechanism 29, the angle information on the hand manipulation portion 12, and the information on a slide position of the hand manipulation portion 12 relative to the slider 13, which are stored in the motion information database 44, as well as the information in the control information database 42. The motion information generator 53 also generates generated force information and generated gripping force information on force and gripping force measured by the force measurement device 1 in accordance with the information in the motion information database 44 and the information in the control information database 42.

The motion information generator 53 transmits the generated position information, the generated angle information, the generated force information, and the generated gripping force information, which are generated by the motion information generator 53, by way of the database input/output unit 45 to the motion information database 44 so as to be stored therein.

When the control mode in the control information database 42 is the "shift mode", the motion information generator 53 generates, as generated position information on a position of the slave mechanism 41, a value obtained by multiplying position information on the master mechanism 29 and a shift gain in the control information database 42. More specifically, assuming that a position of the master mechanism 29 at time $t_1$ is expressed by $(p_{mx1}, p_{my1}, p_{mz1}, p_{m\phi1}, p_{m\theta1}, p_{m\psi1})$ and a shift gain is expressed by $(g_{mx}, g_{my}, g_{mz}, g_{m\phi}, p_{m\theta}, g_{m\psi})$, the motion information generator 53 generates $(g_{mx} \times p_{mx1}, g_{my} \times p_{my1}, g_{mz} \times p_{mz1}, g_{m\phi} \times p_{m\phi1}, g_{m\theta} \times p_{m\theta1}, g_{m\psi} \times p_{m\psi1})$ as a desired position (generated position information) of the slave robot 2.

As to slide manipulation of the hand manipulation portion 12 relative to the slider 13, assuming that slide positions of the hand manipulation portion 12 at time $t_0$ and the time $t_1$ are $l_{m0}$ and $l_{m1}$, respectively, the motion information generator 53 initially generates a shift amount $\Delta l_m = l_{m1} - l_{m0}$ of the hand manipulation portion 12 from the time $t_0$ to the time $t_1$. The motion information generator 53 subsequently multiplies the shift amount $\Delta l_m$ and a slide position gain $s_g$ to calculate $s_g \times \Delta l_m$. The motion information generator 53 then generates, as a desired insertion position (generated position information) of the slave robot 2, a value obtained by adding the calculated value $s_g \times \Delta l_m$ to a current approach direction such as the insertion direction of the slave robot 2.

The motion information generator 53 generates, as generated angle information on the hand mechanism 4, a value obtained by multiplying angle information on the hand manipulation portion 12 in the master mechanism 29 and a hand angle gain in the control information database 42. More specifically, assuming that an angle of the hand manipulation portion 12 at the time $t_1$ is $r_{m1}$ and a hand angle gain is $g_{mr}$, the motion information generator 53 generates $(r_{m1} \times g_{mr})$ as a desired angle of the hand mechanism 4.

The motion information generator 53 generates, as force information after generation, a value obtained by multiplying generated force information detected by the force detector 50 and a force gain in the control information database 42. More specifically, assuming that force at the time $t_1$ is expressed by $f_{s1} = (f_{sx1}, f_{sy1}, f_{sz1}, f_{s\phi1}, f_{s\theta1}, f_{s\psi1})$ and a force gain is expressed by $(g_{fsx}, g_{fsy}, g_{fsz}, g_{fs\phi}, g_{fs\theta}, g_{fs\psi})$, the motion information generator 53 generates force information after generation $g_{fs} \times f_{s1}$ expressed by $(g_{fsx} \times f_{sx1}, g_{fsy} \times f_{sy1}, g_{fsz} \times f_{sz1}, g_{fs\phi} \times f_{s\phi1}, g_{fs\theta} \times f_{s\theta1}, g_{fs\psi} \times f_{s\psi1})$.

The motion information generator 53 generates, as generated gripping force information, a value obtained by multiplying gripping force detected by the gripping force detector 55 and a gripping force gain in the control information database 42. More specifically, assuming that gripping force at the time $t_1$ is $f_{h1}$ and a gripping force gain is $g_{fh}$, the motion information generator 53 generates gripping force after generation $g_{fh} \times t_{h1}$ as generated gripping force information.

Figure 14A:
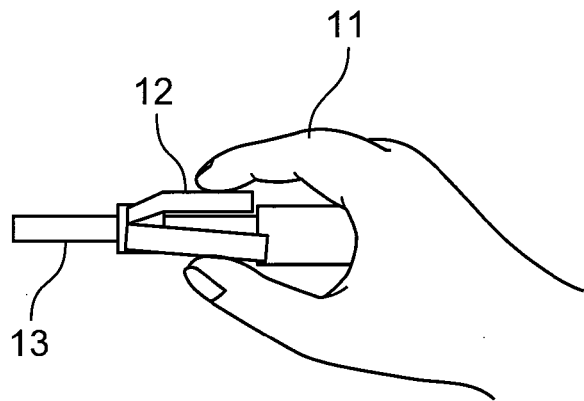
FIG. 14A is an explanatory view of manipulation of the hand manipulation mechanism according to the first embodiment of the present invention.
Figure 14B:
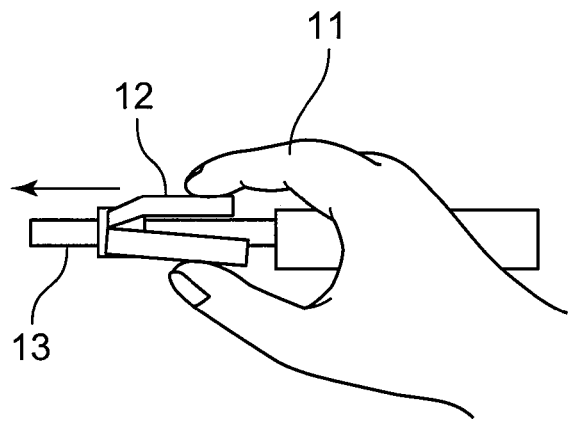
FIG. 14B is an explanatory view of the manipulation of the hand manipulation mechanism according to the first embodiment of the present invention.

The master device 80 for the master slave apparatus according to the first embodiment is capable of providing the operator 11 with the following sense of manipulation. When the control mode in the control information database 42 is the "force mode", the operator 11 is provided with a sense of manipulation as if a gripped position of the tweezers is changed as motion of the slave 13. More specifically, when the operator 11 grips the hand manipulation portion 12 that is slid to a rear portion (so as to be close to the edge of the end of the master mechanism 29) of the slider 13 as shown in FIG. 14A, the operator 11 is provided with a sense of manipulation as if fingers grip rear portions of tweezers 54 as shown in FIG. 15A. Similarly, when the operator 11 grips the hand manipulation portion 12 that is slid relatively to the slider 13 to a position in front of the position of FIG. 14A as shown in FIG. 14B, the operator 11 is provided with a sense of manipulation as if fingers grip front portions of the tweezers 54 relative to the position of FIG. 15A as shown in FIG. 15B. When the operator 11 grips the hand manipulation portion 12 that is slid further forward relatively to the slider 13 as shown in FIG. 14C, the operator 11 is provided with a sense of manipulation as if fingers grip the distal ends of the tweezers 54 as shown in FIG. 15C.

In order to provide such a sense of manipulation, the motion information generator 53 corrects at least one of a shift gain, a hand angle gain, a force gain, and a gripping force gain in the control information database 42 in accordance with a slide position of the hand manipulation portion 12 relative to the slider 13.

Figure 14C:
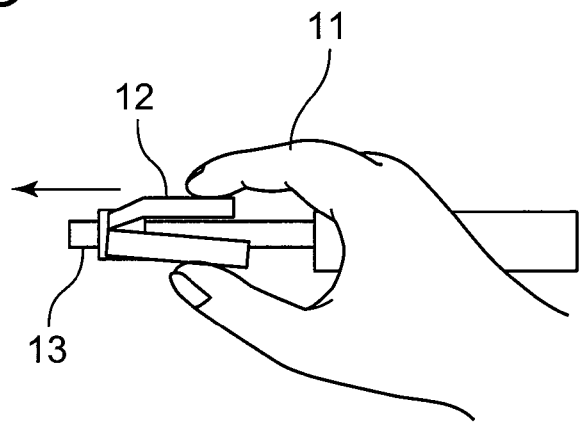
FIG. 14C is an explanatory view of the manipulation of the hand manipulation mechanism according to the first embodiment of the present invention.
Figure 15A:
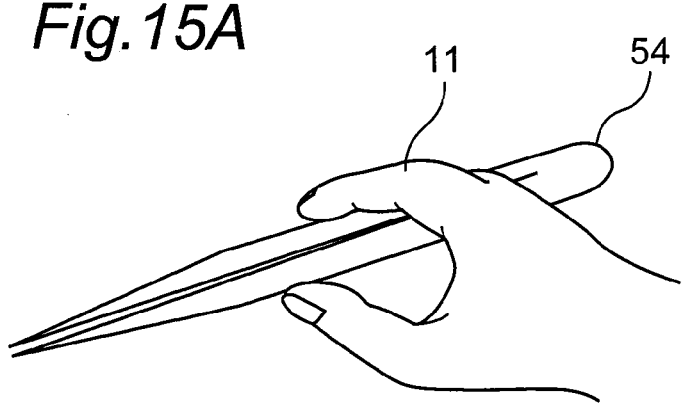
FIG. 15A is an explanatory view of manipulation of tweezers according to the first embodiment of the present invention.
Figure 15B:
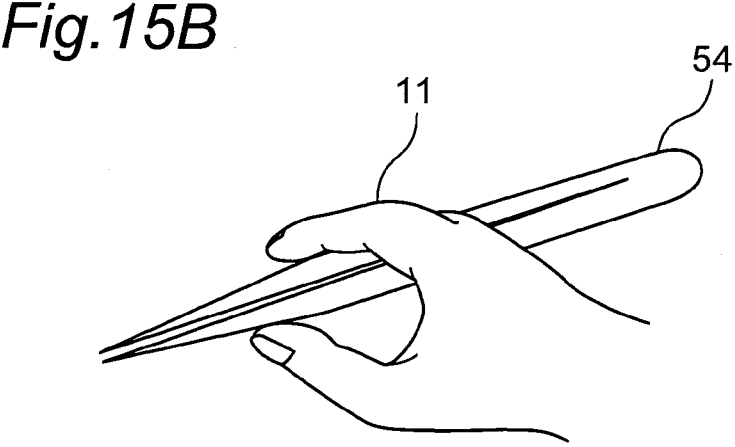
FIG. 15B is an explanatory view of the manipulation of the tweezers according to the first embodiment of the present invention.
Figure 15C:
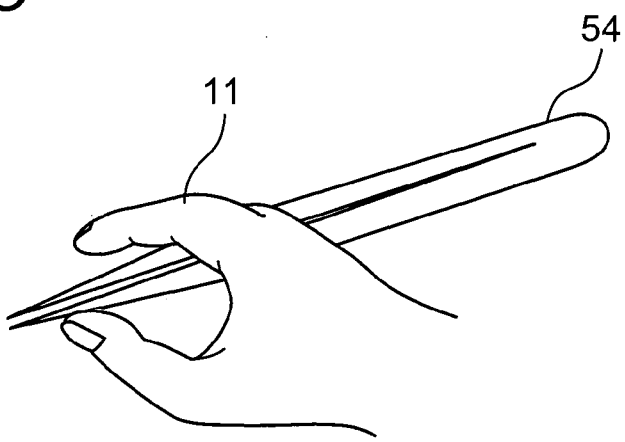
FIG. 15C is an explanatory view of the manipulation of the tweezers according to the first embodiment of the present invention.

More specifically, when a slide position is shifted forward from the slide position of FIG. 14A to the slide position of FIG. 14B or 14C (a slide position is shifted forward from a position at that time), the motion information generator 53 sets to decrease a shift gain and a hand angle gain in the control information database 42. In other words, when a slide position is shifted forward on the slide rail 13a, the tweezers 54 are assumed to be gripped at the distal ends and manipulated. The motion information generator 53 sets to decrease a shift gain and a hand angle gain so that a finer task can be performed easily. In an example, in a case where a default shift gain is set preliminarily and when a slide position is shifted forward, the motion information generator 53 sets to decrease a shift gain compared to the default shift gain. In contrast, the motion information generator 53 sets to increase a shift gain compared to the default shift gain when a slide position is shifted backward. In another example, the motion information generator 53 sets a shift gain smaller than a shift gain that is already used. In a case where a slide position of the hand manipulation portion 12 is shifted to the front end on the slider 13, it is necessary to shift backward the slide position of the hand manipulation portion 12 on the slider 13 in the reset mode where control operation is stopped temporarily and then shift forward the slide position of the hand manipulation portion 12 on the slider 13 in the force mode. In contrast, the motion information generator 53 sets to increase a force gain and a gripping force gain when a slide position is shifted forward, in order to easily transmit. In an example, in a case where a default shift gain is set preliminarily and when a slide position is shifted forward, the motion information generator 53 sets to increase a shift gain compared to the default shift gain. In contrast, the motion information generator 53 sets to decrease a shift gain compared to the default shift gain when a slide position is shifted backward. In another example, the motion information generator 53 sets a shift gain larger than a shift gain that is already used. More specifically, assuming that a slide position of FIG. 14A is 0 and a shift amount of the slide position shifted forward from the position of FIG. 14A is $\Delta l_m$, the motion information generator 53 calculates a post-correction shift gain $g_{mnew}$=a pre-correction shift gain $g_{mold}$−$\alpha \Delta l_m$. In this equation, $\alpha$ is a constant set by the motion information generator 53 so that $\alpha \times \Delta l_m$ does not exceed the pre-correction shift gain $g_{mold}$. The motion information generator 53 calculates a post-correction hand angle gain $g_{rmnew}$=a pre-correction hand angle gain $g_{rmold}$−$\beta \times \Delta l_m$. In this equation, $\beta$ is a constant set by the motion information generator 53 so that $\beta \times \Delta l_m$ does not exceed $g_{rmold}$. The motion information generator 53 calculates a post-correction force gain $g_{fsnew}$=a pre-correction force gain $g_{fsold}$+$\gamma \times \Delta l_m$. In this equation, $\gamma$ is a constant set by the motion information generator 53 so that $\gamma \times \Delta l_m$ does not exceed the post-correction force gain $g_{fsnew}$. The motion information generator 53 calculates a post-correction gripping force gain $g_{fhnew}$=a pre-correction gripping force gain $g_{fhold}$+$\omega \times \Delta l_m$. In this equation, $\omega$ is a constant set by the motion information generator 53 so that $\omega \times \Delta l_m$ does not exceed the post-correction force gain $g_{fhnew}$. Similarly to the method for the case where the control mode in the control information database 42 is the shift mode, the motion information generator 53 generates a generated position information on the slave mechanism 41 as well as generated angle information, generated force information, and generated gripping force information on the hand mechanism 4, in accordance with the shift gain, the hand angle gain, the force gain, and the gripping force gain thus calculated. The motion information generator 53 transmits these pieces of information by way of the database input/output unit 45 to the motion information database 44 so as to be stored therein.

The manipulation procedure of the master slave apparatus 100 according to the first embodiment is described below with reference to the flowchart in FIG. 16. Described with reference to FIG. 16 is the procedure of transmitting to the master robot 3 force applied to the component 5 and gripping force of gripping the component 5 when the operator 11 manipulates the master robot 3 so that the slave robot 2 moves to insert the component 5 gripped by the hand mechanism 4 into the insertion port 6.

Initially in step S101, the master hand control device 23 obtains position information on the master mechanism 29 when the master mechanism 29 moves, angle information on the hand manipulation portion 12 in the hand manipulation mechanism 30, and information on a slide position of the hand manipulation portion 12 relative to the slider 13, to store in the motion information database 44 by way of the database input/output unit 45.

Subsequently in step S102, the motion information generator 53 generates generated position information and generated angle information on positions and angles of the slave mechanism 41 and the hand mechanism 4 in accordance with the position information on the master mechanism 29, the angle information on the hand manipulation portion 12, and the information on the slide position of the hand manipulation portion 12 relative to the slider 13, which are stored in the motion information database 44, as well as the information in the control information database 42.

Then, in step S103, the slave hand controller 32 in the slave hand control device 31 controls the slave mechanism 41 and the hand mechanism 4 so as to move in compliance in accordance with the generated position information and the generated angle information thus generated by the motion information generator 53.

Then, in step S104, the force measurement device 1 obtains information on force of the slave robot 2 in contact with an external object and information on gripping force of the hand mechanism 4 gripping the component 5.

Then, in step S105, the motion information generator 53 refers to the control information database 42, and the flow proceeds to step S106 if the control mode in the control information database 42 is the force mode whereas the flow proceeds to step S107 if the control mode is the shift mode.

In step S106, the motion information generator 53 corrects at least one of a shift gain, a hand angle gain, a force gain, and a gripping force gain in the control information database 42 in accordance with the slide position of the hand manipulation portion 12 relative to the slider 13. The motion information generator 53 generates, in accordance with the corrected gain, generated position information on the slave mechanism 41, as well as generated angle information, generated force information, and generated gripping force information on the hand mechanism 29. The flow subsequently proceeds to step S108. The generated position information on the slave mechanism 41 and the generated angle information on the hand mechanism 29 thus generated in step S106 are used after the flow in FIG. 16 is ended once and steps S101 and S102 are executed again and when the flow returns to step S103 and at step S103, the slave hand controller 32 in the slave hand control device 31 controls the slave mechanism 41 and the hand mechanism 4 so as to operate in compliance.

In step S107, the motion information generator 53 generates, in accordance with the slide position of the hand manipulation portion 12, as generated position information on the slave mechanism 41, a value obtained by multiplying the position information on the master mechanism 29 and a value obtained by multiplying a shift gain in the control information database 42 and displacement of the slide position. The flow then ends. The generated position information on the slave mechanism 41 is used after the flow in FIG. 16 is ended once and steps S101 and S102 are executed again and when the flow returns to step S103 and at step S103, the slave hand controller 32 in the slave hand control device 31 controls the slave mechanism 41 and the hand mechanism 4 so as to operate in compliance.

Then, in step S108, the master hand controller 22 controls motion of the hand manipulation mechanism 30, so that the generated force information and the generated gripping force information, which has been transmitted from the motion information generator 53 to the hand manipulation mechanism 30 by way of the master hand controller 22, are transmitted to a hand of the operator 11. In summary, the master hand controller 22 controls the master mechanism 29 in accordance with the generated force information so as to transmit the generated force information to the hand of the person (operator), whereas the master hand controller 22 controls the hand manipulation mechanism 30 in accordance with the generated gripping force information so as to transmit the generated gripping force information to the hand of the person.

If the task is completed, the flow then ends with no further action. If the task is not completed, the flow returns to step S101.

Effects of First Embodiment

As described above, the master robot 3 includes the hand manipulation mechanism 30 provided with the hand manipulation portion 12 and the slider 13, and the hand manipulation portion 12 is slid relatively to the slider 13 while the control mode is switched between the shift mode and the force mode. It is thus possible to perform fine adjustment in an approach direction such as the insertion direction of the slave robot 2, as well as provide the operator 11 with a sense of manipulation as if a gripped position of the tweezers 54 is changed. In other words, the master mechanism 29 is capable of feeding back, to the hand of the operator 11, a value approximate to force sensed by the hand of the operator 11 when manipulating the hand mechanism 4 such as tweezers or a gripper gripped by the slave mechanism 41 while changing a gripped position of the hand mechanism 4. It is thus possible to sense force as if the gripped position of the tweezers or the gripper is changed.

Second Embodiment

According to the second embodiment of the present invention, in a case where front portions of the hand mechanism 4 such as tweezers are gripped with fingers, inertia N is decreased so that the tweezers can be operated easily (with weak force). In contrast, in a case where rear portions of the tweezers are gripped with fingers, the inertia M is increased so that the tweezers can be operated uneasily (with strong force). In other words, spring sense is changed to express spring sense of the tweezers in accordance with a slide position of the hand manipulation portion 12. More specifically, when front portions of the tweezers are gripped with fingers, damping D is decreased so that the tweezers can be operated without sensing too much spring sense. In contrast, when rear portions of the tweezers are gripped with fingers, the damping D is increased so that the tweezers can be operated while sensing large spring sense.

This configuration is described in detail below.

Figure 17:
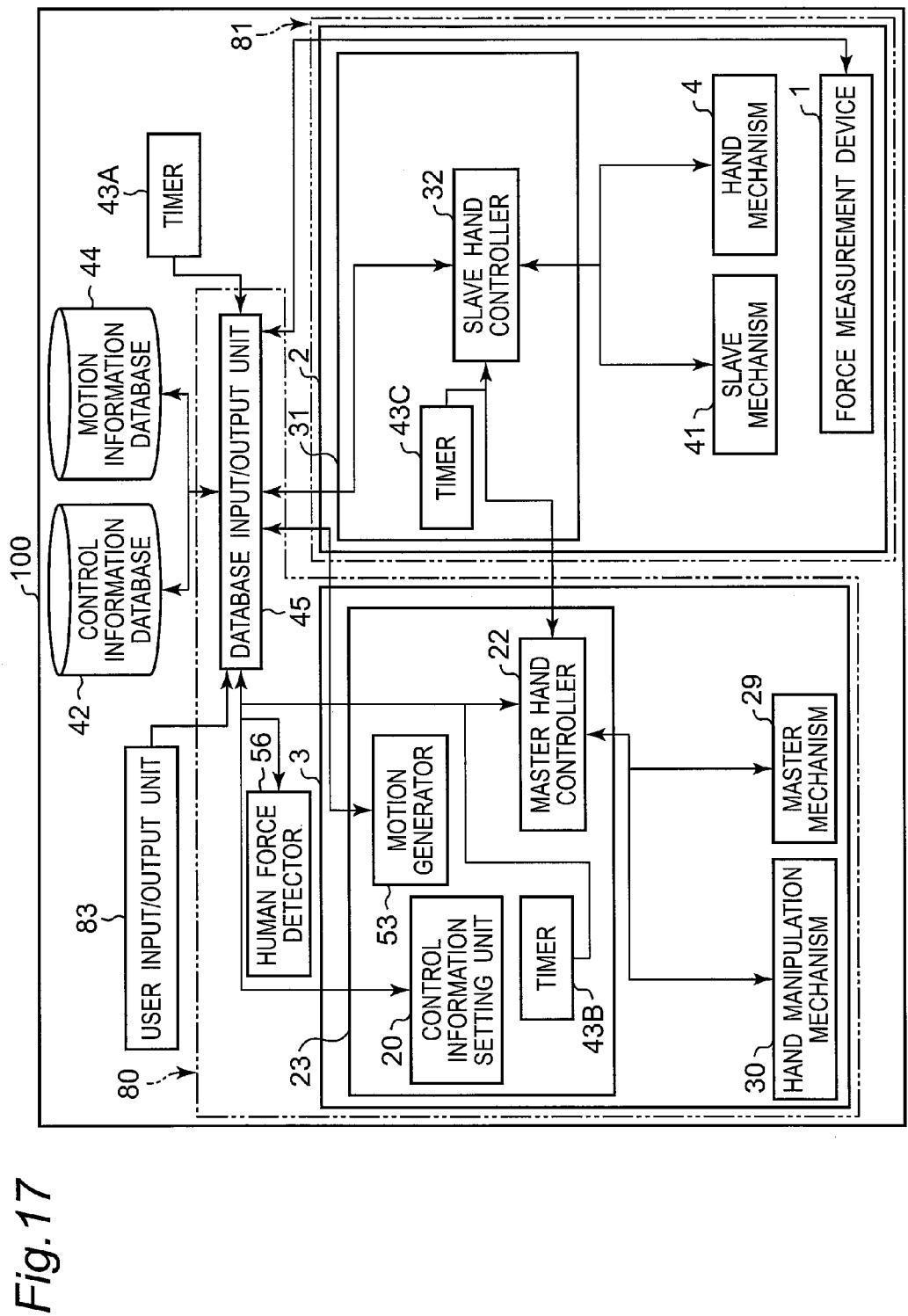
FIG. 17 is a block diagram of a detailed configuration of a master slave apparatus according to a second embodiment of the present invention.

FIG. 17 is a configuration view showing the master robot 3 of the master device for the master slave apparatus according to the second embodiment, the slave robot 2, the force measurement device 1, a human force detector 56, the motion information database 44, the control information database 42, the timer 43A, and the database input/output unit 45. The human force detector 56 functions as one example of a human force acquiring unit. The following description of the second embodiment includes only portions different from the first embodiment, and portions in common with the first embodiment are not described repeatedly.

—Control Information Database 42—

Figures 18, 19A:
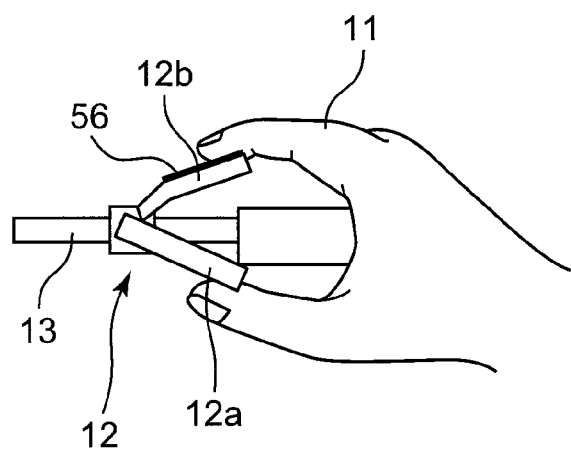
FIG. 18 is a chart on a control information database according to the second embodiment of the present invention.
FIG. 19A is an explanatory view of manipulation of a hand manipulation mechanism according to the second embodiment of the present invention.

The control information database 42 stores, in addition to the control information according to the first embodiment, the inertia M, the damping D, and stiffness K as setting parameters of mechanical impedance set values of the hand manipulation portion 12. FIG. 18 exemplifies information stored in the control information database 42.

<<Human Force Detector 56>>

Figure 19B:
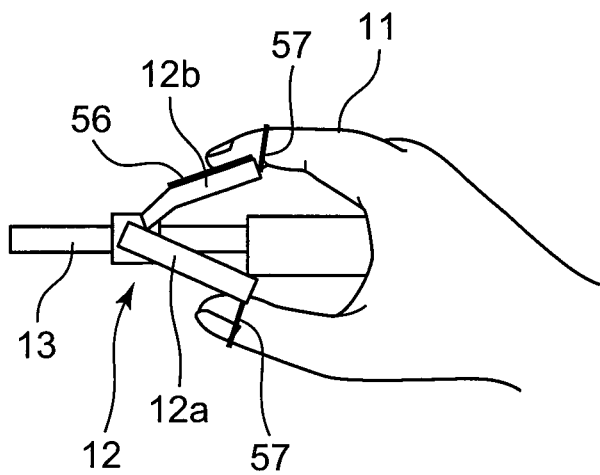
FIG. 19B is an explanatory view of the manipulation of the hand manipulation mechanism according to the second embodiment of the present invention.

The human force detector 56 detects force applied by the operator 11 who manipulates the hand manipulation portion 12. More specifically, as shown in FIG. 19, the hand manipulation portion 12 can include a pair of movable manipulation portions 12a and 12a in place of the pair of open/close manipulation portions 12a and 12b that include the movable manipulation portion 12a and the fixed manipulation portion 12b. In other words, the pair of movable manipulation portions 12a and 12a can be opened or closed symmetrically with respect to the center axis of the slide rail 13a. At least one of the pair of movable manipulation portions 12a and 12a is provided with a strain sensor that exemplifies the human force detector 56. If fingers of the operator 11 are apart from the movable manipulation portions 12a and 12a of the hand manipulation portion 12, the operator 11 is incapable of manipulating to open the movable manipulation portions 12a and 12a of the hand manipulation portion 12. As shown in FIG. 19B, the fingers of the operator 11 are fixed to the movable manipulation portions 12a and 12a of the hand manipulation portion 12 by means of fixing portions 57 such as tape, so that each of the movable manipulation portions 12a and 12a shifts integrally with a corresponding one of the fingers.

<<Control Information Setting Unit 20>>

The control information setting unit 20 sets, in addition to the control information according to the first embodiment, mechanical impedance set values of the hand manipulation portion 12 in accordance with a slide position of the hand manipulation portion 12. The setting parameters of the mechanical impedance set values include the inertia M, the damping D, and the stiffness K. The control information setting unit 20 is capable of setting desired sensitivity in this case.

When the hand manipulation portion 12 is gripped at a front portion of the slide rail 13a, the control information setting unit 20 sets to decrease the inertia M so as to provide the operator 11 with a sense of manipulation as if the tweezers are gripped at the distal ends. The operator 11 is thus capable of manipulating the hand manipulation portion 12 easily with weak force and achieving adjustment of a level of force similar to actual tweezers. In contrast, the control information setting unit 20 sets to increase the inertia M so as to provide the operator 11 with a sense of manipulation as if the tweezers are gripped at rear portions. The operator 11 thus moves the tweezers uneasily.

When the hand manipulation portion 12 is gripped at a front portion of the slide rail 13a, the control information setting unit 20 sets to decrease the damping so as to provide the operator 11 with a sense of manipulation as if the tweezers are gripped at the distal ends. In this case, the tweezers have less damping. In contrast, when the hand manipulation portion 12 is gripped at a rear portion of the slide rail 13a, the control information setting unit 20 sets to increase the damping so that the tweezers have more damping.

Furthermore, when the tweezers are gripped at the distal ends, the control information setting unit 20 sets to decrease the stiffness so as to provide the operator 11 with softer spring sense. In contrast, when the tweezers are gripped at rear portions, the control information setting unit 20 sets to increase the stiffness so as to provide the operator 11 with harder spring sense.

<<Master Hand Control Device 23 and Slave Hand Control Device 31>>

In addition to the motion according to the first embodiment, the master hand control device 23 causes the human force detector 56 to detect force applied by the operator 11, and controls the hand manipulation portion 12 into the direction of the force applied by the operator 11 by means of impedance control.

In order to allow the master hand control device 23 to achieve impedance control of the mechanical impedance value of the hand manipulation portion 12, the master hand control device 23 calculates desired generation output $r_{d\Delta}$ of an angle of the hand manipulation portion 12 by the following equation (1). The master hand control device 23 generates, as generated angle information, a desired angle after generation $r_{dm}$ that is obtained by adding the desired generation output $r_{d\Delta}$ to a current angle $r_d$ of the hand manipulation portion 12.

$$r_{d\Delta} = (s^2 \hat{M} + s\hat{D} + \hat{K})^{-1} F \qquad \text{Equation (1)}$$

In this equation, s is the Laplace operator and F is force detected by the human force detector 56 (force of the operator 11).

The master hand control device 23 controls to open or close the hand movable manipulation portion 12a and the hand fixed manipulation portion 12b of the hand manipulation portion 12 so as to be in compliance with the desired angle $r_{dm}$ of the hand manipulation portion 12.

The master hand control device 23 transmits every certain period (e.g. every 1 msec) counted by the timer 43B, to the slave hand control device 31, position information on the master mechanism 29 when the master mechanism 29 moves, angle information on the hand manipulation portion 12 in the hand manipulation mechanism 30, and a slide position of the hand manipulation portion 12. Furthermore, the slave hand control device 31 transmits force to the operator 11 by way of the database input/output unit 45 in accordance with received force information or gripping force information and the mode in the control information database 42. In order to achieve both of the effects of impedance control and force feedback, the master hand control device 23 performs control in accordance with, s desired coordinates, a value obtained by adding the desired angle $r_{dm}$ obtained earlier and a position $\Delta p_f$ corresponding to force to be fed back.

The slave hand control device 31 is configured similarly to that of the first embodiment, and is not described repeatedly.

Figure 20:
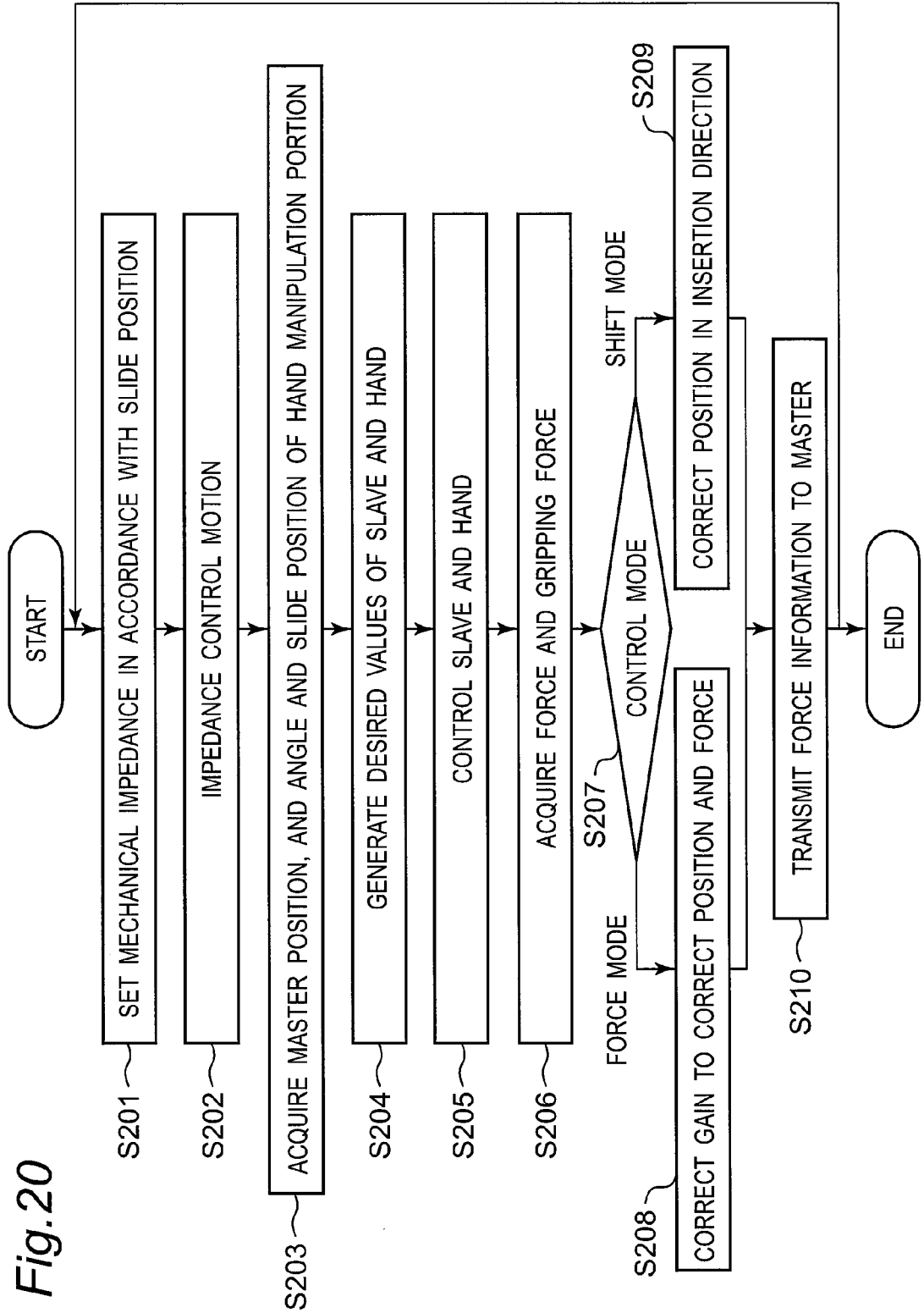
FIG. 20 is a flowchart of the master slave apparatus according to the second embodiment of the present invention.
Figure 21A:
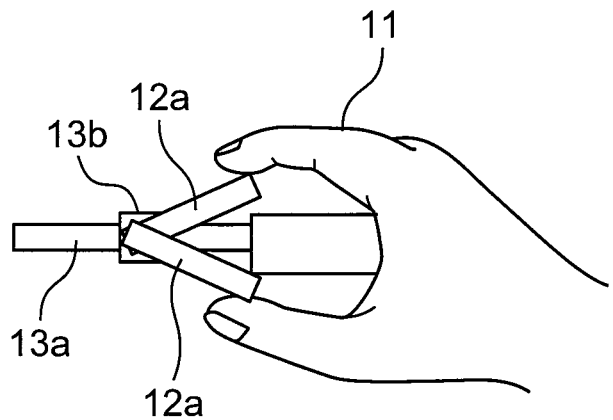
FIG. 21A is an explanatory view of component inserting manipulation of a master mechanism in a shift mode according to a modification example of the first embodiment of the present invention.
Figure 21B:
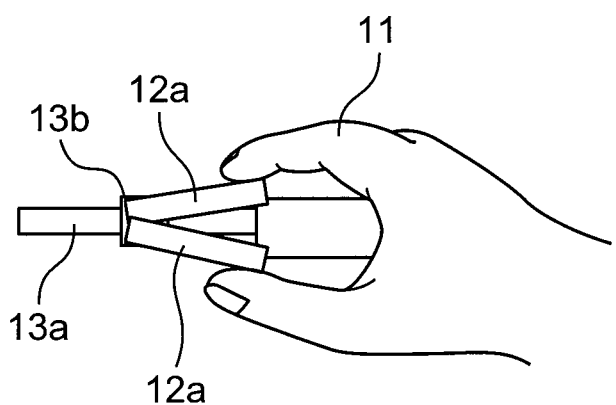
FIG. 21B is an explanatory view of the component inserting manipulation of the master mechanism in the shift mode according to the modification example of the first embodiment of the present invention.
Figure 21C:
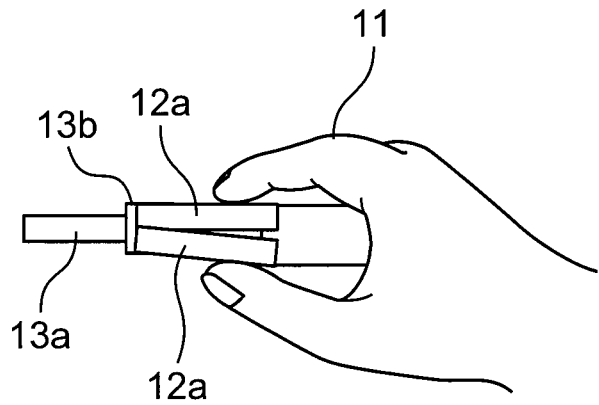
FIG. 21C is an explanatory view of the component inserting manipulation of the master mechanism in the shift mode according to the modification example of the first embodiment of the present invention.
Figure 21D:
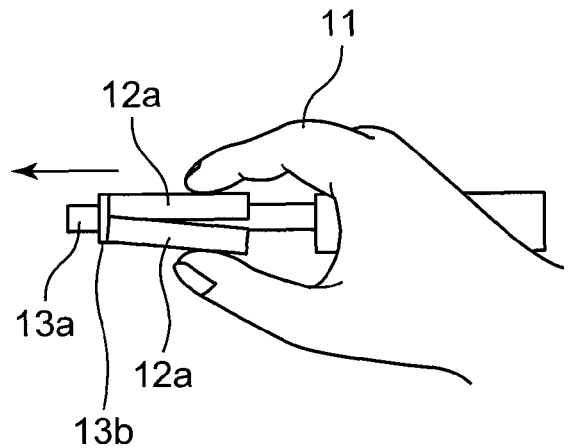
FIG. 21D is an explanatory view of the component inserting manipulation of the master mechanism in the shift mode according to the modification example of the first embodiment of the present invention.
Figure 21E:
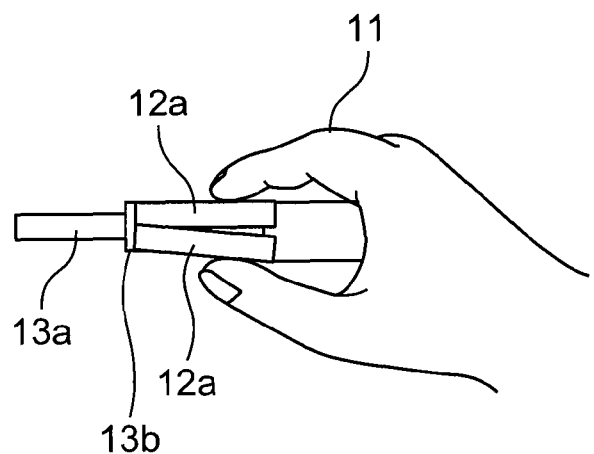
FIG. 21E is an explanatory view of component inserting manipulation of the master mechanism in a reset mode according to the modification example of the first embodiment of the present invention.
Figure 21F:
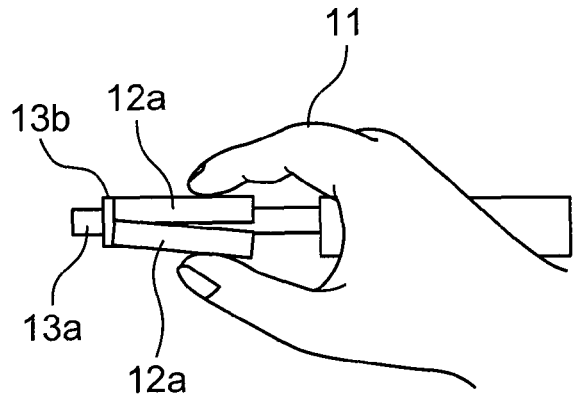
FIG. 21F is an explanatory view of component inserting manipulation of the master mechanism in a force mode according to the modification example of the first embodiment of the present invention.
Figure 21G:
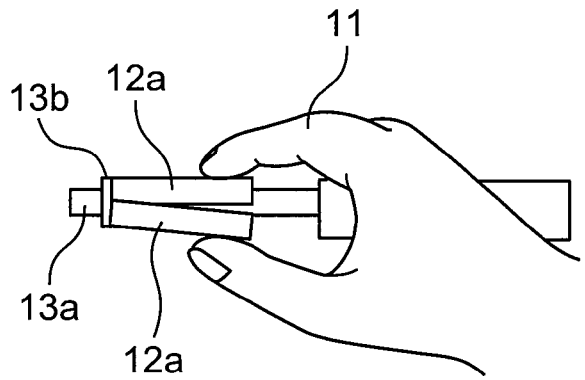
FIG. 21G is an explanatory view of the component inserting manipulation of the master mechanism in the force mode according to the modification example of the first embodiment of the present invention.
Figure 21H:
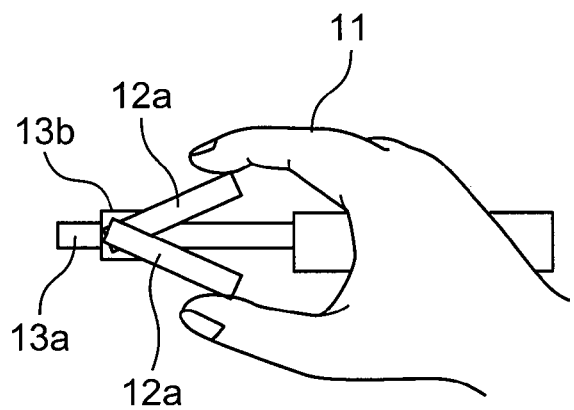
FIG. 21H is an explanatory view of the component inserting manipulation of the master mechanism in the force mode according to the modification example of the first embodiment of the present invention.

A manipulation procedure of the master slave apparatus 100 according to the second embodiment is described with reference to the flowchart in FIG. 20. Described with reference to FIG. 18 is the procedure of transmitting, to the master robot 3, force applied to the component 5 or gripping force of gripping the component 5 when a sense of manipulation of the hand manipulation portion 12 in the master robot 3 is controlled by means of impedance control in accordance with a slide position of the hand manipulation portion 12 by the operator 11 so as to move the slave robot 2 and insert the component 5 gripped by the hand mechanism 4 into the insertion port 6.

In step S201, the control information setting unit 20 sets a mechanical impedance value of the hand manipulation portion 12 in accordance with a slide position of the hand manipulation portion 12.

Subsequently in step S202, the master hand control device 23 controls the hand manipulation portion 12 in accordance with the mechanical impedance value set by the control information setting unit 20.

Then, in step S203, the motion information generator 53 in the master hand control device 23 obtains position information on the master mechanism 29 when the master mechanism 29 moves, angle information on the hand manipulation portion 12 in the hand manipulation mechanism 30, and information on the slide position of the hand manipulation portion 12.

Then, in step S204, the motion information generator 53 generates generated position information and generated angle information on positions and angles of the slave mechanism 41 and the hand mechanism 4 in accordance with the position information on the master mechanism 29 when the master mechanism 29 moves, the angle information on the hand manipulation portion 12 in the hand manipulation mechanism 30, and the information on the slide position of the hand manipulation portion 12, which are obtained in step S203.

Then, in step S205, the slave hand control device 31 controls, by way of the master hand control device 23, the slave mechanism 41 and the hand mechanism 4 so as to move in compliance in accordance with the generated position information and the generated angle information from the motion information generator 53.

Then, in step S206, the force measurement device 1 obtains information on force of the slave robot 2 in contact with an external object and information on gripping force of the hand mechanism 4 gripping the component 5.

Then, in step S207, the motion information generator 53 refers to the control information database 42, and the flow proceeds to step S208 if the control mode in the control information database 42 is the force mode, whereas the flow proceeds to step S209 if the control mode is the shift mode.

In step S208, the motion information generator 53 corrects at least one of a shift gain, a hand angle gain, a force gain, and a gripping force gain in the control information database 42 in accordance with the slide position of the hand manipulation portion 12. The motion information generator 53 generates, in accordance with the corrected gain, generated position information on the slave mechanism 41, as well as generated angle information, generated force information, and generated gripping force information on the hand mechanism 4. The flow subsequently proceeds to step S210.

In step S209, the motion information generator 53 generates, in accordance with the slide position of the hand manipulation portion 12 relative to the slider 13, as generated position information on the slave mechanism 41, a value obtained by multiplying the position information on the master mechanism 29 and a value obtained by multiplying a shift gain in the control information database 42 and displacement of the slide position. The flow subsequently proceeds to step S210.

Then, in step S210, the master hand controller 22 controls motion of the hand manipulation mechanism 30, so that the hand manipulation mechanism 30 moves in accordance with the generated force information and the generated gripping force information that are transmitted from the motion information generator 53 to the hand manipulation mechanism 30 by way of the master hand controller 22 and the generated force information and the generated gripping force information are transmitted to a hand of the operator 11.

If the task is completed, the flow then ends with no further action. If the task is not completed, the flow returns to step S201.

Effects of Second Embodiment

As described above, the control information setting unit 20 changes the mechanical impedance value of the hand manipulation portion 12 in accordance with a position of the hand manipulation portion 12 relative to the slider 13 in the master robot 3. It is thus possible to provide the operator 11 with a sense of manipulation as if a gripped position of the tweezers is changed.

When the control mode is switched between the force mode and the shift mode in the first embodiment, robot coordinates of the master robot 3 may not be fixed but may be changed by a slide distance of the hand manipulation portion 12 when the hand manipulation portion 12 is slid in the shift mode. In this case, it is possible to obtain the same sense of manipulation as that in the case where the slide position is not changed even though the slide position is changed in the shift mode.

As to force feedback according to the first embodiment, the slave mechanism 41 includes the force detector 50 and the gripping force detector 55. In an alternative configuration that does not include the force detector 50 or the gripping force detector 55, a position can be fed back to the master mechanism 29 and the hand manipulation portion 12 in accordance with a position of the slave mechanism 41 or an angle of the hand mechanism 4.

Furthermore, the slave robot 2 includes the motion information generator and the master robot 3 includes the control information setting unit 20 in the first embodiment. These functions can be provided to either one of the robots 2 and 3.

When force detected by the human force detector 56 is equal to or less than a predetermined threshold in the second embodiment, the master hand controller 22 can control to open the hand manipulation portion 12. This configuration achieves the state where the tweezers are opened when the tweezers are not gripped. The hand manipulation portion 12 can be alternatively provided with a spring mechanism instead of achieving spring by means of control.

As shown in FIGS. 21A to 21H, the hand manipulation portion 12 can include the pair of movable manipulation portions 12a and 12a in place of the pair of open/close manipulation portions 12a and 12b that include the movable manipulation portion 12a and the fixed manipulation portion 12b. In other words, the pair of movable manipulation portions 12a and 12a can be opened or closed symmetrically with respect to the center axis of the slide rail 13a. FIGS. 21A to 21H correspond to FIGS. 6A to 6H, respectively.

Figure 22A:
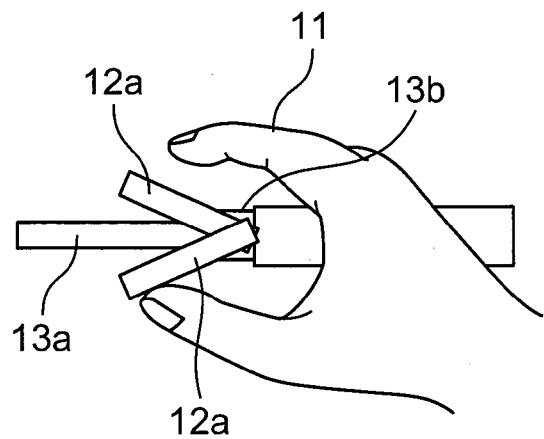
FIG. 22A is an explanatory view of a configuration of a hand manipulation portion according to the modification example of the first embodiment of the present invention.
Figure 22B:
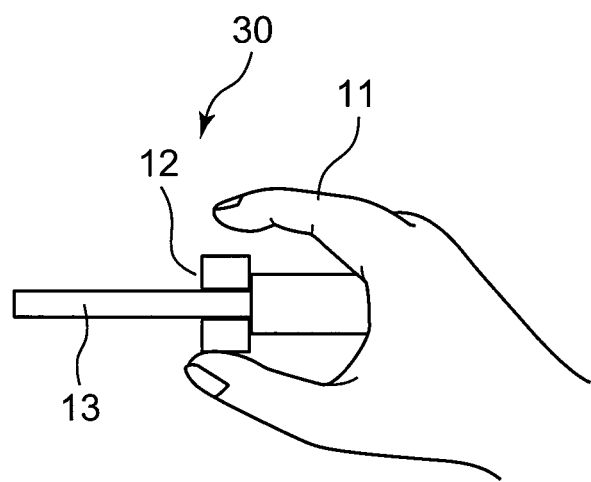
FIG. 22B is an explanatory view of a configuration of a hand manipulation portion according to another modification example of the first embodiment of the present invention.

As shown in FIG. 22A, the hand manipulation portion 12 according to the first embodiment to be manipulated can be alternatively located reversely with respect to the axis direction of the slider 13a. As shown in FIG. 22B, the hand manipulation portion 12 can be still alternatively provided as buttons.

The control information setting unit 20 according to the first embodiment has the "shift mode" and the "force mode". The control information setting unit 20 can further have a "gripping force mode". More specifically, when the hand manipulation portion 12 is slid to a front portion relatively to the slider 13 in the "gripping force mode", the hand mechanism 4 is controlled to grip with stronger force.

The control information setting unit 20 according to the second embodiment sets the three impedance values of the inertia M, the damping D, and the stiffness K. When the hand mechanism 4 includes tweezers, the control information setting unit 20 can set only the stiffness as the most effective parameter.

The mechanical impedance value is set in accordance with a slide position in the second embodiment. The mechanical impedance value can be determined in accordance with not only the slide position but also a shape or a material of the tweezers.

Each of the master mechanism and the slave mechanism is hexaxial, although the present invention is not limited thereto.

Though the present disclosure has been described above based on the above first to second embodiments and modification examples, the present disclosure should not be limited to the above-described first to second embodiments and/or modification examples. For example, the present disclosure also includes the following cases.

Part or entirety of each of the above-described control devices is actually a computer system that includes, for example, a microprocessor, ROM, RAM, hard disk unit, display unit, keyboard, mouse, and the like. A computer program is stored on the RAM or the hard disk unit. Functions of each of the devices can be achieved by the microprocessor operating according to the computer program. The computer program mentioned here is a combination of a plurality of instruction codes that indicate commands to a computer for achieving predetermined functions.

For example, each component can be implemented as a result that a program executing section (part/unit) such as a CPU reads and executes software programs recorded in a recording medium such as a hard disk or semiconductor memory.

In addition, it may be possible to execute the program by downloading it from a server or reading it from a predetermined storage medium (an optical disc such as a CD-ROM, a magnetic disc, a semiconductor memory, or the like).

Further, one or more computers can be used to execute the program. That is, centralized processing or distributed processing can be performed.

By properly combining the arbitrary embodiment(s) or modification example(s) of the aforementioned various embodiments and modification examples, the effects possessed by the embodiment(s) or modification example(s) can be produced.

The master device for the master slave apparatus, a method of controlling the same, and the master slave robot according to the present invention allow sensing force as if a gripped position of tweezers or a gripper gripped at a slave is changed when performing a task of gripping a target object and being in contact with a target article. The present invention is useful for performing a task of attaching a component (an example of the target object) to an insertion port (an example of the target article) of a printed circuit board for an instrument such as a television, a DVD recorder, or a mobile phone in cell production at a plant.

Although the present disclosure has been fully described in connection with the embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

What is claimed is:

1. A master device for a master slave apparatus, provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to be manipulated by a person to cause remote manipulation of the slave mechanism, the manipulation of the hand manipulation mechanism of the master mechanism causing the hand mechanism of the slave mechanism to grip the target object and perform the task on the target article, wherein the hand manipulation mechanism includes a hand manipulation portion having a pair of open/close manipulation portions configured to be manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, the slider has an end coupled to a distal end of a robot arm of the master mechanism, and includes a linear slide rail and an operation portion supporter that is engaged with the linear slide rail and is manually slid on the linear slide rail, and the operation portion supporter is provided with the pair of open/close manipulation portions; and the master device further comprises a master hand control device configured to transmit, to the slave mechanism, motion information used for manipulating the hand mechanism in accordance with a position of the hand manipulation portion relative to the slider and the angle between the pair of open/close manipulation portions.

2. The master device for the master slave apparatus according to claim 1, wherein the motion information used for manipulating the hand mechanism includes angle information on the hand manipulation portion and a position of the slave mechanism.

3. A master device for a master slave apparatus, provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to be manipulated by a person to cause remote manipulation of the slave mechanism, the manipulation of the hand manipulation mechanism of the master mechanism causing the hand mechanism of the slave mechanism to grip the target object and perform the task on the target article, wherein the hand manipulation mechanism includes a hand manipulation portion having a pair of open/close manipulation portions configured to be manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, the master device further comprises a motion information generator and a master hand controller, the motion information generator configured to, in accordance with a position of the hand manipulation portion relative to the slider, generate motion information to increase generated force information or generated gripping force information as the position of the hand manipulation portion relative to the slider shifts to be distant from an edge of an end of the master mechanism, and generate motion information to decrease the generated force information or the generated gripping force information as the position of the hand manipulation portion relative to the slider shifts so as to be close to the edge of the end of the master mechanism, and the master hand controller configured to transmit, to the slave mechanism, the motion information generated by the motion information generator.

4. The master device for the master slave apparatus according to claim 1, wherein the master device further comprises:

a slide position acquiring unit configured to acquire a position of the hand manipulation portion relative to an end of the master mechanism as the position of the hand manipulation portion relative to the slider, and an open/close angle acquiring unit configured to acquire the angle between the pair of open/close manipulation portions of the hand manipulation portion.

5. The master device for the master slave apparatus according to claim 1, wherein the master device further comprises:

a slide position acquiring unit configured to acquire a position of the hand manipulation portion relative to an end of the master mechanism as the position of the hand manipulation portion relative to the slider, an open/close angle acquiring unit configured to acquire the angle between the pair of open/close manipulation portions of the hand manipulation portion, a force information acquiring unit configured to acquire information on force externally applied to the slave mechanism, and a gripping force information acquiring unit configured to acquire information on gripping force of the hand mechanism gripping the target object, the master hand control device includes a motion information generator configured to generate generated force information or generated gripping force information for motion information in accordance with the position of the hand manipulation portion relative to the slider and the force information acquired by the force information acquiring unit or the gripping force information acquired by the gripping force information acquiring unit, and a master hand controller configured to transmit, to the master mechanism, the generated force information and the generated gripping force information generated by the motion information generator as the motion information, and the master slave apparatus further includes a slave hand controller connected to the slave mechanism and the master hand controller, the slave hand controller configured to output, as motion information to be transmitted to the slave mechanism, the motion information on the master mechanism received from the master hand controller.

6. The master device for the master slave apparatus according to claim 5, wherein
the motion information generator is connected to the slave mechanism and the master hand controller, and is configured to generate motion information on the master mechanism transmitted from the master hand control device in accordance with the position of the hand manipulation portion relative to the slider acquired by the slide position acquiring unit.

7. The master device for the master slave apparatus according to claim 1, further comprising:
a control information setting unit configured to switch a control mode between a shift mode for shifting the hand mechanism and a force mode for allowing the hand mechanism to perform the task, wherein
the master hand control device is configured to output motion information used for controlling the slave mechanism in accordance with the control mode set by the control information setting unit.

8. The master device for the master slave apparatus according to claim 3, further comprising:
a control information setting unit configured to switch a control mode between a shift mode for shifting the hand mechanism and a force mode for allowing the hand mechanism to perform the task; and
a master hand control device, wherein
the master hand control device is configured to output motion information used for controlling the slave mechanism in accordance with the control mode set by the control information setting unit.

9. The master device for the master slave apparatus according to claim 7, further comprising:
a reset mode setting unit configured to set a reset mode for temporally stopping control operation to reset the position of the hand manipulation portion relative to the slider when the control information setting unit switches the control mode between the shift mode and the force mode.

10. The master device for the master slave apparatus according to claim 8, further comprising:
a reset mode setting unit configured to set a reset mode for temporally stopping control operation to reset the position of the hand manipulation portion relative to the slider when the control information setting unit switches the control mode between the shift mode and the force mode.

11. The master device for the master slave apparatus according to claim 5, wherein
the motion information generator is configured to generate to increase the generated force information or the generated gripping force information as the position of the hand manipulation portion relative to the slider shifts to be distant from an edge of the end of the master mechanism, and to decrease the generated force information or the generated gripping force information as the position of the hand manipulation portion relative to the slider shifts to be close to the edge of the end of the master mechanism.

12. The master device for the master slave apparatus according to claim 1, further comprising:
a human force acquiring unit configured to acquire a force applied by the person when the person grips the hand manipulation portion; and
a control information setting unit, wherein
the control information setting unit is configured to set a mechanical impedance value of the hand manipulation portion in accordance with the force applied by the person acquired by the human force acquiring unit and the position of the hand manipulation portion relative to the slider, and
the master hand control device is configured to control the hand manipulation portion in accordance with the mechanical impedance value set by the control information setting unit.

13. The master device for the master slave apparatus according to claim 3, further comprising:
a human force acquiring unit configured to acquire a force applied by the person when the person grips the hand manipulation portion; and
a control information setting unit, wherein
the control information setting unit is configured to set a mechanical impedance value of the hand manipulation portion in accordance with the force applied by the person acquired by the human force acquiring unit and the position of the hand manipulation portion relative to the slider, and
the master hand control device is configured to control the hand manipulation portion in accordance with the mechanical impedance value set by the control information setting unit.

14. The master device for the master slave apparatus according to claim 12, wherein the control information setting unit is configured to set to decrease an inertia value of the mechanical impedance value as the position of the hand manipulation portion relative to the slider shifts to be distant from an edge of an end of the master mechanism.

15. The master device for the master slave apparatus according to claim 13, wherein the control information setting unit is configured to set to decrease an inertia value of the mechanical impedance value as the position of the hand manipulation portion relative to the slider shifts to be distant from the edge of the end of the master mechanism.

16. The master device for the master slave apparatus according to claim 12, wherein the control information setting unit is configured to set to decrease a stiffness value as the mechanical impedance value as the position of the hand manipulation portion relative to the slider shifts to be distant from an edge of an end of the master mechanism.

17. The master device for the master slave apparatus according to claim 12, wherein the control information setting unit is configured to set to decrease a damping value as the mechanical impedance value as the position of the hand manipulation portion relative to the slider shifts to be distant from an edge of an end of the master mechanism.

18. A master slave apparatus comprising:
a hand mechanism,
a slave mechanism, and
a master device for the master slave apparatus, provided to the master slave apparatus comprising the hand mechanism configured to open or close to grip a target object, and the slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to be manipulated by a person to cause remote manipulation of the slave mechanism, the manipulation of the hand manipulation mechanism of the master mechanism causing the hand mechanism of the slave mechanism to grip the target object and perform the task on the target article, wherein the hand manipulation mechanism includes a hand manipulation portion having a pair of open/close manipulation portions configured to be manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, the slider has an end coupled to a distal end of a robot arm of the master mechanism, and includes a linear slide rail and an operation portion supporter that is engaged with the linear slide rail and is manually slid on the linear slide rail, and the operation portion supporter is provided with the pair of open/close manipulation portions, and the master device further comprises a master hand control device configured to transmit, to the slave mechanism, motion information used for manipulating the hand mechanism in accordance with a position of the hand manipulation portion relative to the slider and the angle between the pair of open/close manipulation portions.

19. A master slave apparatus comprising:
a hand mechanism;
a slave mechanism; and
a master device for the master slave apparatus, provided to the master slave apparatus comprising the hand mechanism configured to open or close to grip a target object, and the slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to be manipulated by a person to cause remote manipulation of the slave mechanism, the manipulation of the hand manipulation mechanism of the master mechanism causing the hand mechanism of the slave mechanism to grip the target object and perform the task on the target article, wherein the hand manipulation mechanism includes a hand manipulation portion having a pair of open/close manipulation portions configured to be manipulated by the person, and a slider along which the hand manipulation portion moves forward or backward, and the pair of open/close manipulation portions is configured to be manipulated to be opened or closed between opened positions and closed positions to change an angle between the pair of open/close manipulation portions and open or close a pair of open/close members of the hand mechanism, the master device further comprises a motion information generator and a master hand controller, the motion information generator configured to, in accordance with a position of the hand manipulation portion relative to the slider, generate motion information to increase generated force information or generated gripping force information as the position of the hand manipulation portion relative to the slider shifts to be distant from an edge of an end of the master mechanism, and generate motion information to decrease the generated force information or the generated gripping force information as the position of the hand manipulation portion relative to the slider shifts so as to be close to the edge of the end of the master mechanism, and the master hand controller configured to transmit, to the slave mechanism, the motion information generated by the motion information generator.

20. A method of controlling a master device for a master slave apparatus, the master device being provided to the master slave apparatus comprising a hand mechanism configured to open or close to grip a target object, and a slave mechanism that has the hand mechanism and is configured to perform a task on a target article with the target object gripped by the hand mechanism, the master device comprising a hand manipulation mechanism configured to manipulate the hand mechanism and a master mechanism that includes the hand manipulation mechanism and is configured to be manipulated by a person to cause remote manipulation of the slave mechanism, the manipulation of the hand manipulation mechanism of the master mechanism causing the hand mechanism of the slave mechanism to grip the target object and perform the task on the target article, the hand manipulation mechanism including a hand manipulation portion having a pair of open/close manipulation portions configured to be manipulated by the person, and a slider along which the hand manipulation portion moves forward or backward, the pair of open/close manipulation portions being configured to be manipulated to be opened or closed between opened positions and closed positions to change an angle between the pair of open/close manipulation portions and open or close a pair of open/close members of the hand mechanism, and the slider has an end coupled to a distal end of a robot arm of the master mechanism, and includes a linear slide rail and an operation portion supporter that is engaged with the linear slide rail and is manually slid on the linear slide rail, and the operation portion supporter is provided with the pair of open/close manipulation portions arranged to form a V shape with a center on a turn fulcrum, the method comprising:

when the operation portion supporter is manually slid on the linear slide rail together with the pair of open/close manipulation portions, acquiring, at a slide position acquiring unit, a position of the hand manipulation portion relative to an end of the master mechanism as the position of the hand manipulation portion relative to the slider coupled to the distal end of the robot arm of the master mechanism;

acquiring, at an open/close angle acquiring unit, the angle between the pair of open/close manipulation portions of the hand manipulation portion; and transmitting from a master hand control device to the slave mechanism, motion information used for manipulating the hand mechanism in accordance with the position of the hand manipulation portion relative to the slider or the angle between the pair of open/close manipulation portions.

21. The master device for the master slave apparatus according to claim 1, wherein the operation portion supporter is provided with the pair of open/close manipulation portions arranged to form a V shape with a center on a turn fulcrum.

* * * * *